(12) United States Patent
Ivanov et al.

(10) Patent No.: US 9,712,311 B2
(45) Date of Patent: Jul. 18, 2017

(54) METHOD AND APPARATUS OF MAPPING ONE OR MORE MESSAGES ONTO TRANSMISSION RESOURCE

(71) Applicant: Telefonaktiebolaget L M Ericsson (publ), Stockholm (SE)

(72) Inventors: Sergey Ivanov, Ottawa (CA); Christien LeBlanc, Ottawa (CA); Petter Sundberg, Knivsta (SE); Niclas Wiberg, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 645 days.

(21) Appl. No.: 14/110,160

(22) PCT Filed: Sep. 20, 2013

(86) PCT No.: PCT/SE2013/051100
§ 371 (c)(1),
(2) Date: Oct. 7, 2013

(87) PCT Pub. No.: WO2014/178767
PCT Pub. Date: Nov. 6, 2014

(65) Prior Publication Data
US 2014/0321368 A1 Oct. 30, 2014

Related U.S. Application Data

(60) Provisional application No. 61/817,451, filed on Apr. 30, 2013.

(51) Int. Cl.
*H04L 5/00* (2006.01)
*H04W 48/12* (2009.01)
*H04W 72/00* (2009.01)

(52) U.S. Cl.
CPC ............ *H04L 5/0058* (2013.01); *H04L 5/003* (2013.01); *H04W 48/12* (2013.01); *H04W 72/00* (2013.01)

(58) Field of Classification Search
USPC ......................................................... 370/329
See application file for complete search history.

(56) References Cited

U.S. PATENT DOCUMENTS

| | | | |
|---|---|---|---|
| 2011/0151910 A1* | 6/2011 | Kim | ........................ H04L 5/003 455/509 |
| 2011/0194524 A1 | 8/2011 | Hedlund et al. | |

(Continued)

OTHER PUBLICATIONS

Dhalman, Erik et al., "4G LTE/LTE-Advanced for Mobile Broadband", 4G LTE/LTE-Advanced for Mobile Broadband, Chapter 10, Mar. 29, 2011, 143-202.

*Primary Examiner* — Alpus H Hsu
*Assistant Examiner* — Hooman Houshmand
(74) *Attorney, Agent, or Firm* — Murphy, Bilak & Homiller, PLLC

(57) ABSTRACT

Method in a network node of mapping one or more messages onto transmission resource for transmitting to a wireless device. The one or more messages are processed by the network node. The network node and the wireless device are adapted to be comprised in a wireless communications network. The network node maps the one or more processed messages onto the transmission resource. This is performed according to indexing information comprised in the one or more messages, and to a precalculated mapping table. The precalculated mapping table is calculated prior to obtaining the one or more messages to be mapped. The network node, the communications network, a second network node, a core network node in the wireless communications network, and methods therein are described.

28 Claims, 21 Drawing Sheets

(56) References Cited

U.S. PATENT DOCUMENTS

| | | | |
|---|---|---|---|
| 2011/0237283 A1* | 9/2011 | Shan | H04L 5/0091 |
| | | | 455/509 |
| 2011/0243264 A1 | 10/2011 | Hultell et al. | |
| 2011/0269492 A1* | 11/2011 | Wang | H04L 5/003 |
| | | | 455/509 |
| 2012/0182931 A1* | 7/2012 | Shen | H04B 7/155 |
| | | | 370/315 |
| 2013/0039318 A1* | 2/2013 | Wang | H04L 1/0036 |
| | | | 370/329 |
| 2013/0194951 A1* | 8/2013 | Kim | H04W 72/005 |
| | | | 370/252 |
| 2014/0133440 A1* | 5/2014 | Zhang | H04W 72/042 |
| | | | 370/329 |
| 2014/0348090 A1* | 11/2014 | Nguyen | H04W 72/042 |
| | | | 370/329 |

\* cited by examiner

Frequency-first algorithm for symbol calculations
(example for OFDM symbol *l* = 1)

Step C

3. Calculate quadrupled index for each RE group
// Let M = number of REGs this symbol
// Let N = total number of REGs for PBCCH
// bitrev(w,B) reverses the bits in an B-bit word
K = (N + 31) >> 5;
S = (K << 5) - N;
r = 15;
kk = K; if (bitrev(r,5) < S) kk--;
j = 0;
for (i = 0; i < M; i++) {
    j = j + a[i];
    while (j >= kk) {
        j -= kk;
        r = (r + 1) & 31;
        kk = K; if (bitrev(r,5) < S) kk--;
    }
    if (!b[i]) { // if REG not blocked
        r2 = bitrev(r,5);
        if (r2 < S) p = -1; else p = 0;
        j_out = r2 - S + (j + 1) << 5);
        // j_out is the quadrupled index for REG i
    }
}

| 27 | 15 | 7 | ✕ | ✕ | 12 | 16 | 8 | 2 | 26 | 30 | 22 | 37 | 29 | 33 | 17 | 25 | 35 |

Figure 8c

METHOD AND APPARATUS OF MAPPING ONE OR MORE MESSAGES ONTO TRANSMISSION RESOURCE

TECHNICAL FIELD

Embodiments herein relate to a network node, a second network node, a core network node, a wireless communications network, and methods therein. In particular, embodiments herein relate to mapping one or more messages onto transmission resource for transmitting to a wireless device.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

SUMMARY

It is an object of embodiments herein to improve the performance in a wireless communications network by providing an improved way to map one or more messages onto transmission resource for transmitting to a wireless device.

According to a first aspect of embodiments herein, the object is achieved by a method in a network node of mapping one or more messages onto transmission resource for transmitting to a wireless device. The one or more messages are processed by the network node. The network node and the wireless device are adapted to be comprised in a wireless communications network. The network node maps the one or more processed messages onto the transmission resource. This is performed according to indexing information comprised in the one or more messages, and to a precalculated mapping table. The precalculated mapping table is calculated prior to obtaining the one or more messages to be mapped.

According to a second aspect of embodiments herein, the object is achieved by a method in the network node of mapping one or more messages onto transmission resource for transmitting to the wireless device. The one or more messages are processed by the network node. The network node and the wireless device are adapted to be comprised in the wireless communications network. The network node maps the one or more processed messages onto the transmission resource. This is performed according to indexing information comprised in the one or more messages, and to the precalculated mapping table. The precalculated mapping table is calculated prior to obtaining the one or more messages to be mapped. The one or more processed messages comprise the one or more messages, that have undergone at least one of the following actions by the network node: a) preprocessing the one or more messages to encode the one or more messages into a channel; b) performing bit scrambling on the preprocessed one or more messages; c) modulating the scrambled preprocessed one or more messages; d) performing layer mapping on the modulated scrambled preprocessed one or more messages; e) performing precoding on the layer mapped modulated scrambled preprocessed one or more messages, and f) translating groups of bits from the modulated and/or layer mapped and/or precoded, scrambled preprocessed one or more messages into modulation scheme units. The one or more messages are one of: mapped, preprocessed, bit scrambled, modulated, layer mapped, precoded and translated, in parallel.

According to a third aspect of embodiments herein, the object is achieved by a method in second network node of precalculating a mapping table for the network node to map one or more messages onto transmission resource for transmitting to the wireless device. The one or more messages are processed by the network node, the second network node, the network node, and the wireless device are adapted to be comprised in the wireless communications network. The second network node precalculates the mapping table to map the one or more processed messages onto the transmission resource. The precalculated mapping table is calculated prior to obtaining the one or more messages to be mapped. The precalculated mapping table comprises a map of indexed information in the transmission resource. The indexed information comprises one or more indexes, and one or more indexed information units, each with its corresponding index of the one or more indexes. The transmission resource comprises one or more transmission units. Each of the one or more indexes of the indexed information is allocated a transmission resource unit. Each of the one or more indexes in the indexed information corresponds to indexing information comprised in the one or more messages. The second network node also sends the precalculated mapping table to the network node.

According to a fourth aspect of embodiments herein, the object is achieved by a method in a core network node of precalculating a mapping table for the network node to map one or more messages onto transmission resource for transmitting to the wireless device. The one or more messages are processed by the network node, the core network node, the network node, and the wireless device are adapted to be comprised in the wireless communications network. The core network node precalculates the mapping table to map the one or more processed messages onto the transmission resource. The precalculated mapping table is calculated prior to obtaining the one or more messages to be mapped. The precalculated mapping table comprises the map of indexed information in the transmission resource. The indexed information comprises the one or more indexes, and the one or more indexed information units, each with its corresponding index of the one or more indexes. The transmission resource comprises the one or more transmission units. Each of the one or more indexes of the indexed information is allocated a transmission resource unit, and wherein each of the one or more indexes in the indexed information corresponds to indexing information comprised in the one or more messages. The core network node also sends the precalculated mapping table to the network node.

According to a fifth aspect of embodiments herein, the object is achieved by a method in a wireless communications network of mapping by the network node one or more messages onto transmission resource for transmitting to the wireless device. The one or more messages are processed by the network node. The network node and the wireless device are adapted to be comprised in the wireless communications network. The wireless communications network precalculates, by one of the second network node and the core network node, the mapping table to map the one or more processed messages onto the transmission resource. The second network node and the core network node are adapted to be comprised in the wireless communications network. The wireless communications network also sends, by one of the second network node and the core network node, the precalculated mapping table to the network node. The wireless communications network maps, by the network node, the one or more processed messages onto the transmission resource, according to indexing information comprised in the one or more messages, and to the precalculated mapping table. The precalculated mapping table is calculated prior to obtaining the one or more messages to be mapped. The wireless communications network also transmits, by the network node, the transmission resource comprising the processed one or more messages to the wireless device.

According to additional aspects of embodiments herein, the object is achieved, by corresponding embodiments, respectively, in the network node, the second network node, the core network node, and the wireless communications network.

By mapping the one or more processed messages onto the transmission resource according to the precalculated mapping table, which is calculated prior to obtaining the one or more messages to be mapped, the amount of processing in real-time is reduced. The way of mapping the one or more processed messages is thus improved.

Further advantages of some embodiments disclosed herein are discussed further down below.

BRIEF DESCRIPTION OF THE DRAWINGS

Examples of embodiments herein are described in more detail with reference to attached drawings in which:

FIG. 8a-c are schematic representations of embodiments of a precalculating action of a mapping table using a frequency-first algorithm.

DETAILED DESCRIPTION

As part of the solution according to embodiments herein, a problem will first be identified and discussed.

Transmission processing of some channels from a network node to a wireless device, e.g., Physical Downlink Control CHannel (PDCCH), may be time critical. This may be because the available time is short and a strict deadline is present. The input to channel processing may be one or more messages from higher layers, and this information may be difficult to have very early, since it may involve complicated decisions and may depend, for example, on feedback from other nodes, e.g., wireless devices. The output of the processing may need to be delivered in time for transmission over an air interface. In some cases, channel processing may also be demanding because the number of input messages may vary, while the available time for processing may remain constant.

In the case of PDCCH for example, the input to channel PDCCH processing is Downlink Control Information (DCI) messages from the higher layers, and this information may be difficult to have very early, since it involves complicated decisions and depends on feedback from wireless devices such as UEs, and potentially information fed from other nodes. The output may need to be delivered in time for transmission over the air interface. The PDCCH processing may also be demanding because the number of DCI messages may vary, while the available time for processing may remain constant.

Tough processing demands may in principle be met by processing at high clock frequency, i.e., the frequency at which a Central Processing Unit (CPU) is running. The drawback may be that this generally causes high power consumption. One way to provide high processing capacity with low power consumption may be to provide many parallel processing units with lower clock frequency. The problem may be that this requires the processing algorithm to be expressed as parallel algorithms. For some channels, most of the processing steps may be performed after the input messages have been multiplexed into a single bit stream, thereby limiting the opportunities for parallel processing. For example, for the PDCCH, most of the processing steps are performed after the DCI messages have been multiplexed into a single bit stream, as shown in FIG. 1, thereby limiting the opportunities for parallel processing.

Figure 1:
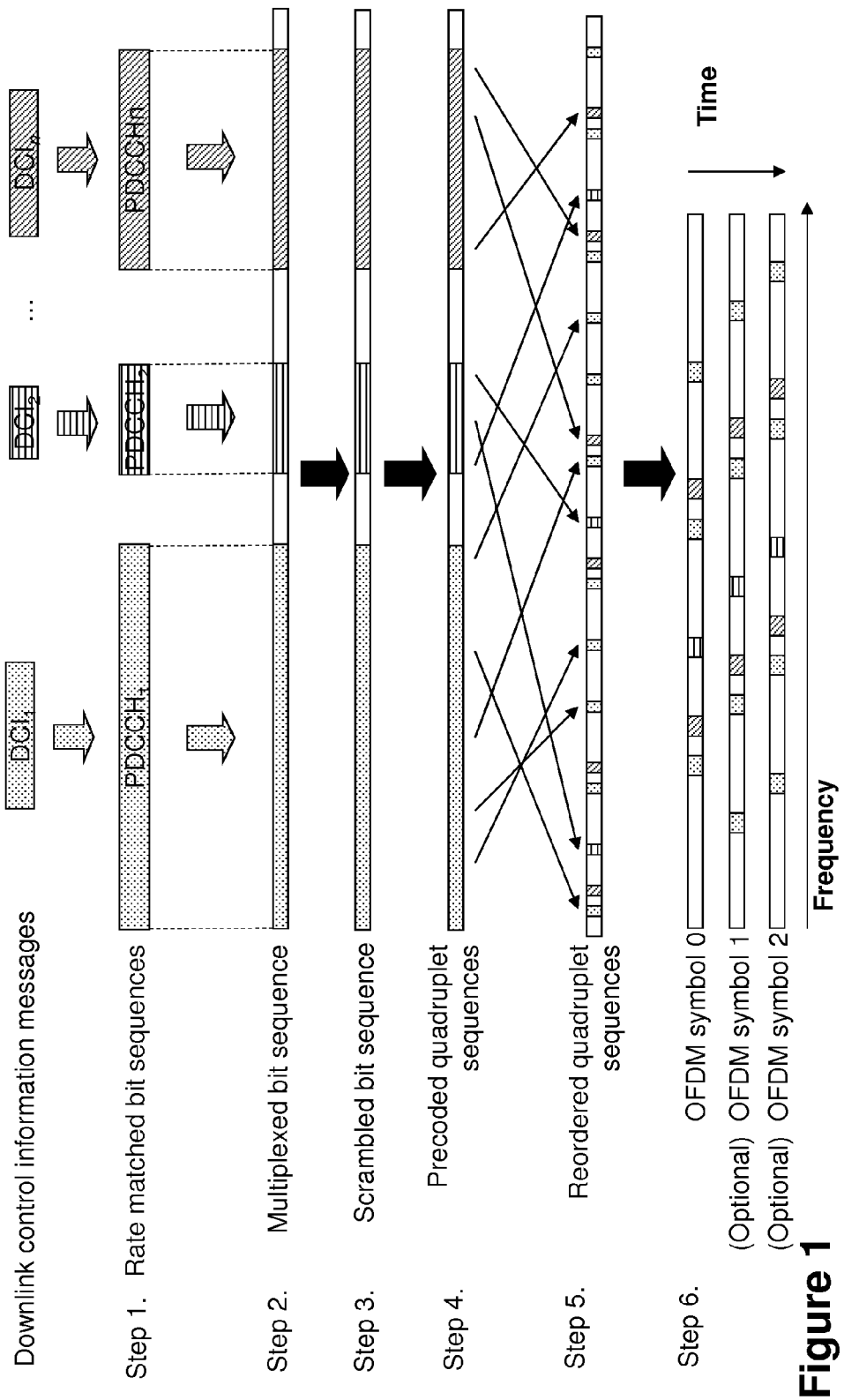
FIG. 1 is a schematic graphical representation of the steps performed when processing the PDCCH for transmission according to known methods.

FIG. 1 is a schematic graphical representation of the steps performed by a network node, such as an eNodeB, when processing a PDCCH for transmission according to known methods, as described in 3GPP TS 36.211 v.11.2.0 and 3GPP TS 36.212 v.11.2.0, some portions of which are included herein, respectively, in Annex 1 and Annex 2. The processing begins after receiving or generating n input DCI messages. In a Step 1, the network node performs CRC attachment, encoding, and rate matching according to 3GPP TS 36.212 Section 5.3.3, which are mapped to n PDCCH channels. In a Step 2, each of the rate matched bit sequences is multiplexed on a single multiplexed bit sequence, according to 3GPP TS 36.211 Sections 6.8.1 and 6.8.2. In Step 3, the network node performs bit scrambling according to 3GPP TS 36.211 Section 6.8.2. The single multiplexed bit sequence is thereby converted into a scrambled bit sequence. In Step 4, the network node carries out modulation, layer mapping, and precoding, according to 3GPP TS 36.211 Sections 6.8.3, 6.8.4. Groups of bits are translated to modulation scheme units, according to the modulation scheme used for each one of the input messages and the number of complex symbols available per modulation scheme unit. For example, for a Quadrature Phase Shift Keying (QPSK) modulation scheme, and four complex symbol groups, groups of 8 bits are translated to quadruplets. The scrambled bit sequence is thereby converted into a number of precoded modulation scheme units, e.g., quadruplet, sequences, one for each antenna port. While the antenna dimension is not shown in FIG. 1, this means that in the case, for example, that two antenna ports were used, one precoded quadruplet sequence may be generated for each of the antenna ports. Next, in step 5, the network node performs interleaving and cyclic shift according to 3GPP TS 36.211 Section 6.8.5. The modulation scheme units, e.g., quadruplets, are reordered in a predetermined way. The precoded modulation scheme unit, e.g., quadruplet, sequences are thereby converted into reordered modulation scheme unit sequences, e.g., reordered quadruplet sequences. Finally, in step 6, the network node maps PDCCH modulation scheme units, e.g., quadruplets, to resource element groups according to 3GPP TS 36.211 Section 6.8.5, as detailed in the following description, and for each of the transmission resource unit groups, e.g., for each one of the Orthogonal Frequency Division Multiplexing (OFDM) symbols allocated to transmit the one or more processed messages. Note that in the non-limiting example of FIG. 1, the presence of OFDM symbols 1 and 2 is optional, depending on the Control Format Indicator (CFI).

Figure 2A:
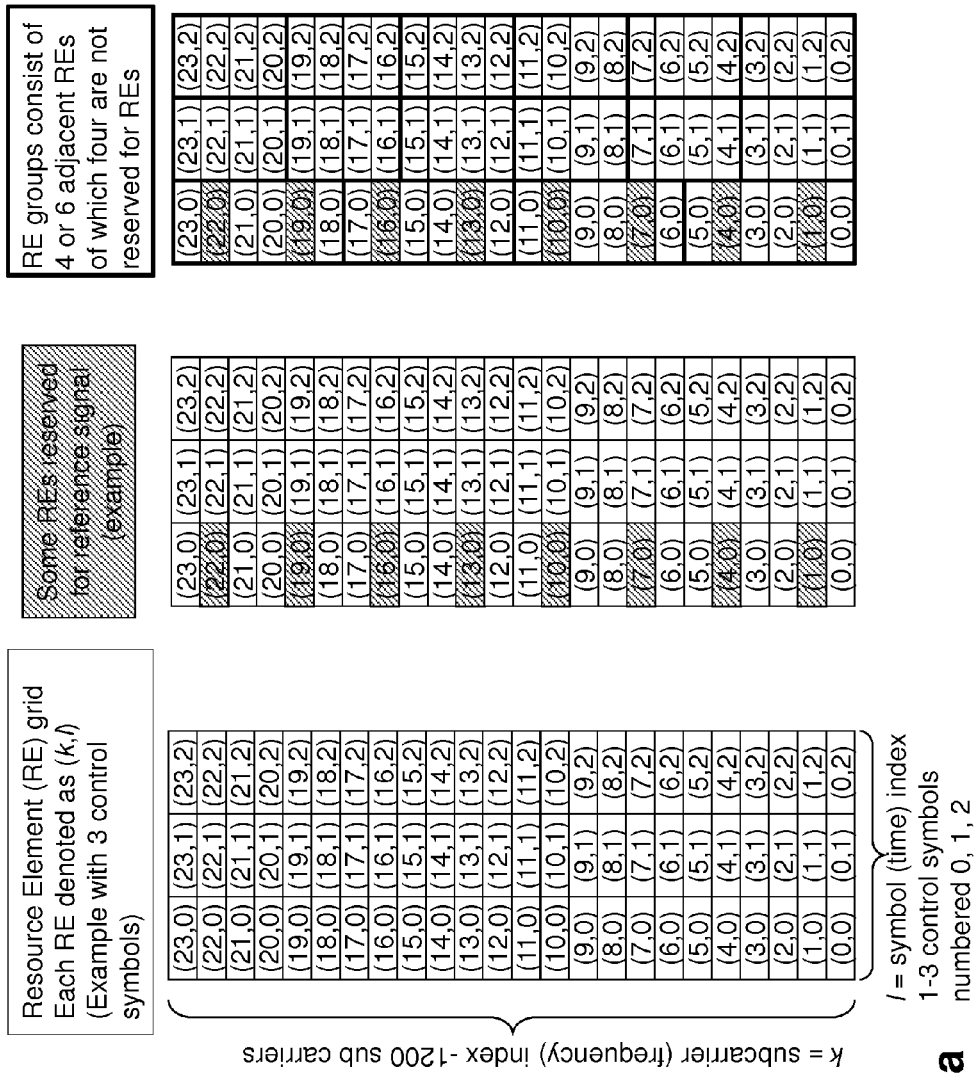
FIGS. 2a-b are each a schematic graphical representation of the available Resource Element (RE) groups for PDCCH transmission.
Figure 2B:
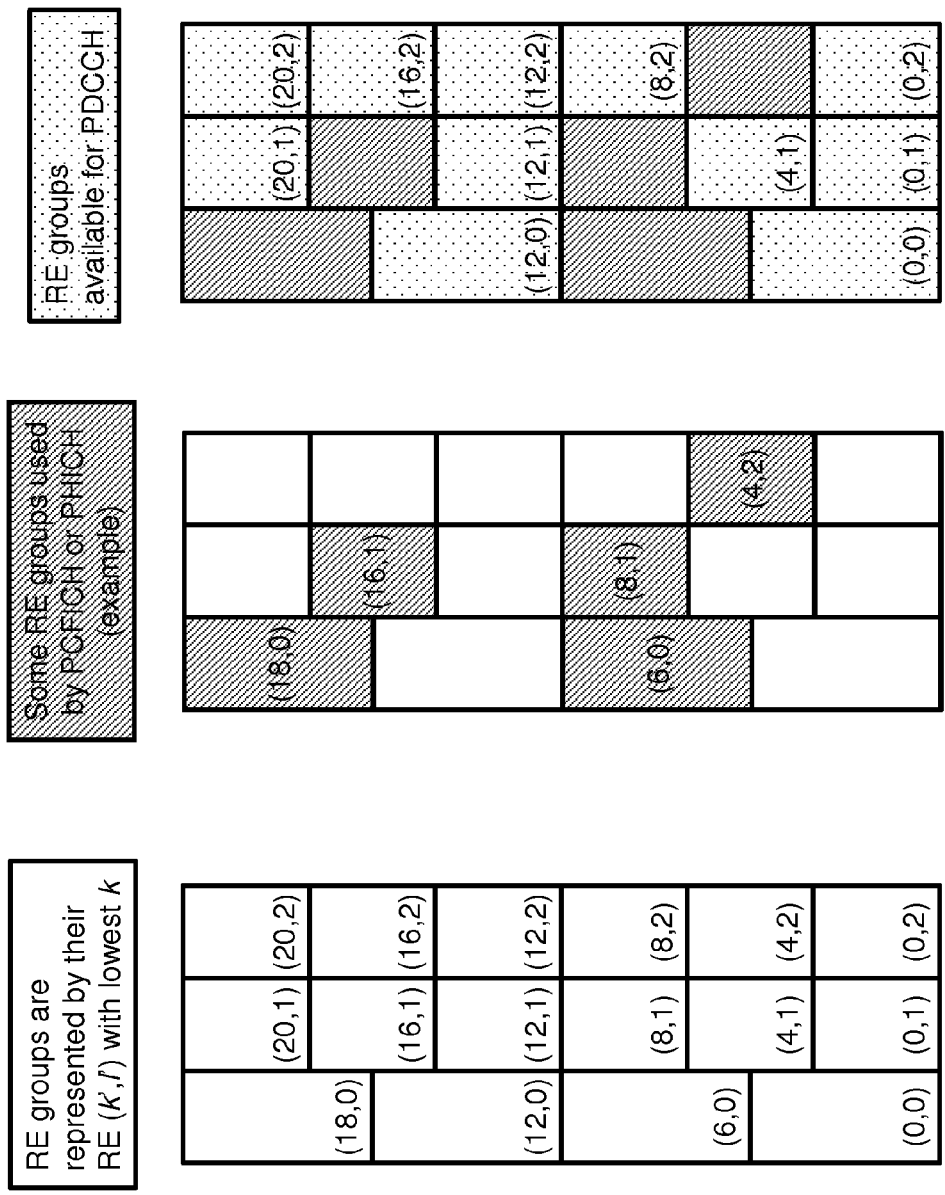
Figure 3:
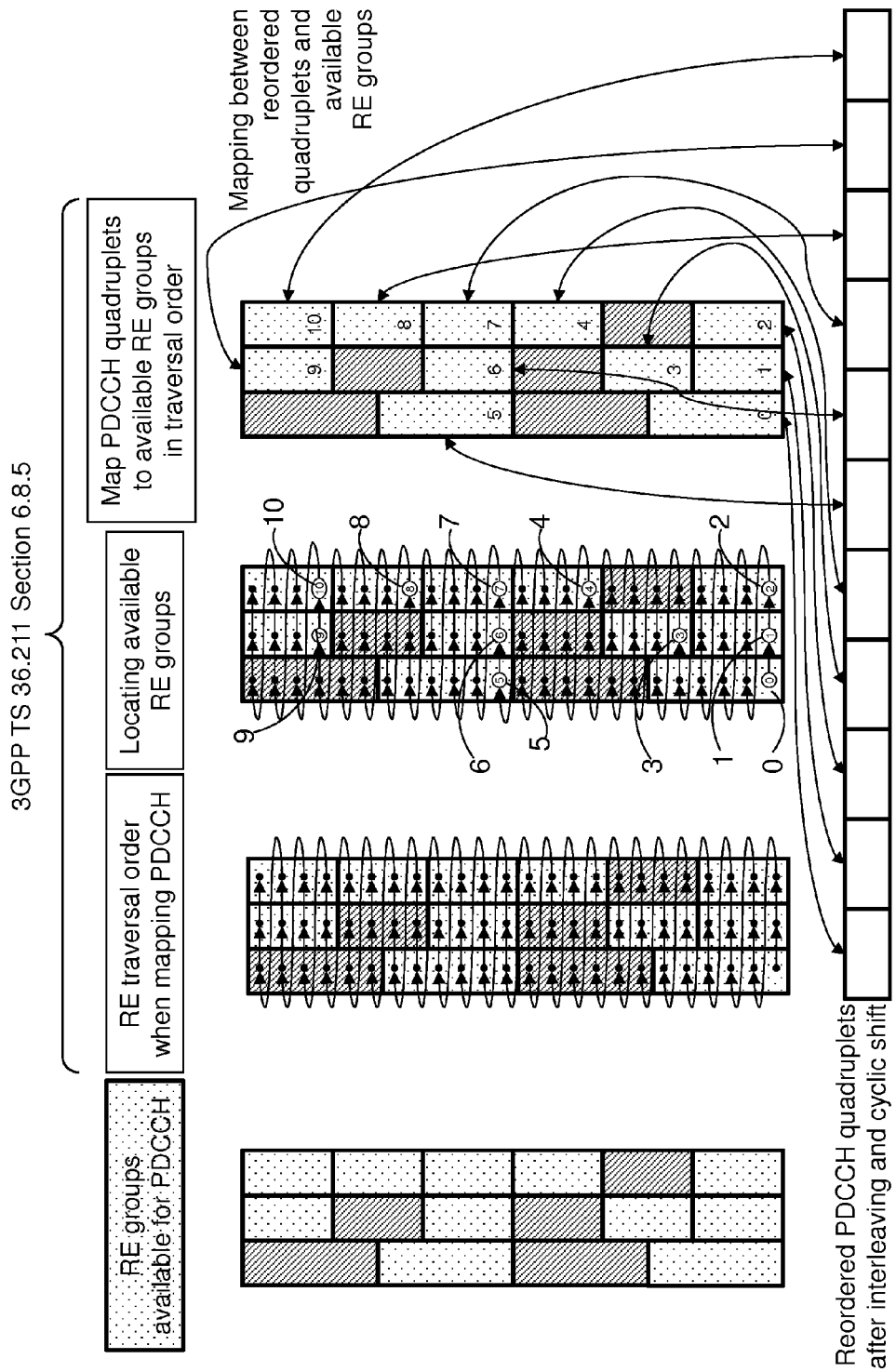
FIG. 3 is a schematic graphical representation of a mapping of PDCCH quadruplets to RE groups according to known methods.

FIGS. 2a and 2b and FIG. 3 show each a schematic graphical representation of how the mapping step is performed according to known methods described in 3GPP TS 36.211 in an illustrative example for PDCCH transmission.

FIGS. 2a and b show a Resource Element (RE) grid, represented in different ways. FIG. 2b is a continuation from the right, of FIG. 2a. In each grid, each RE is denoted as (k,l), as represented in the first three grids from the left, i.e., those in FIG. 2a. k denotes the subcarrier, i.e., frequency, index, which may vary between 0 and the largest frequency index, depending on bandwidth. For example, in an 18 MHz LTE system, k can vary between 0 and 1199. l denotes the symbol, i.e., time, index. Control symbols are those symbols allocated to control information. There can be 1-4 control symbols, numbered 0, 1, 2 and 3. In the example depicted, the grid has 3 control symbols, 0, 1 and 2. Some REs are reserved, for example, for reference signals, as depicted with a striped background in the second and third grids from the left in FIG. 2a. RE groups comprise 4 or 6 adjacent REs, of which four are not-reserved-for REs. RE groups are depicted in the third grid from the left with bold frames. RE groups are represented by their RE (k',l') with lowest k, as shown in the first depicted grid from the left in FIG. 2b. Some RE groups are used by the Physical Control Format Indicator Channel (PCFICH) or the Physical Hybrid automatic repeat request Indicator CHannel (PHICH), which are shown as an illustrative example, with a striped background in the second and third grids from the left in FIG. 2b. The remaining RE groups, depicted with a dotted background in second and third grids from the left in FIG. 2b are available for PDCCH transmission. The RE groups available for PDCCH transmission are marked with their RE (k',l') with lowest k, as shown in the third grid from the left in FIG. 2b.

FIG. 3 begins with the example third RE grid from the left in FIG. 2b, showing the RE groups which are available for PDCCH transmission with dotted background. According to 3GPP TS 36.211 Section 6.8.5, the mapping of the PDCCH, in this example PDCCH quadruplets, to the available RE groups for PDCCH transmission proceeds in traversal order with respect to REs, as depicted in the second grid from the left in the Figure, by the points and the direction of the arrows. RE by RE, i.e., point by point, available RE groups are located, as shown by the circled numbers in the third grid from the left. Finally, the network node maps the reordered PDCCH modulation scheme units, e.g., quadruplets in this example, after interleaving and cyclic shift, which were obtained after step 5 in FIG. 1, to available RE groups in traversal order, as depicted by the arrows in the last grid from the left.

The process just described in FIGS. 1-3 with the example of the PDCCH, is repeated every time that input messages are obtained, e.g., received or generated, marked for transmission in the same transmission period. Thus, current methods of input processing and channel transmission are time consuming.

Embodiments are described herein which show an improved method and apparatus to map one or more processed messages onto transmission resource. There are three aspects of the embodiments disclosed herein, which may work together in some embodiments, to form a more efficient solution. The first is to perform the entire processing independently for each input message, e.g., each DCI message in the case of the PDCCH, i.e., no processing is performed on a multiplexed representation. This way, the processing may be performed in parallel over the input messages, e.g., DCI. The second is to pre-calculate a mapping table that simplifies the work needed to be done for each input message, e.g., DCI. The third is to perform the table pre-calculation on a time/frequency unit-by-time/frequency unit, e.g., symbol-by-symbol, basis, thereby reducing the amount of temporary memory required in the table calculation.

In some particular embodiments, wherein the channel is PDCCH, a method is presented herein comprising a table-driven parallel PDCCH transmission processing, as described below.

Figure 4:
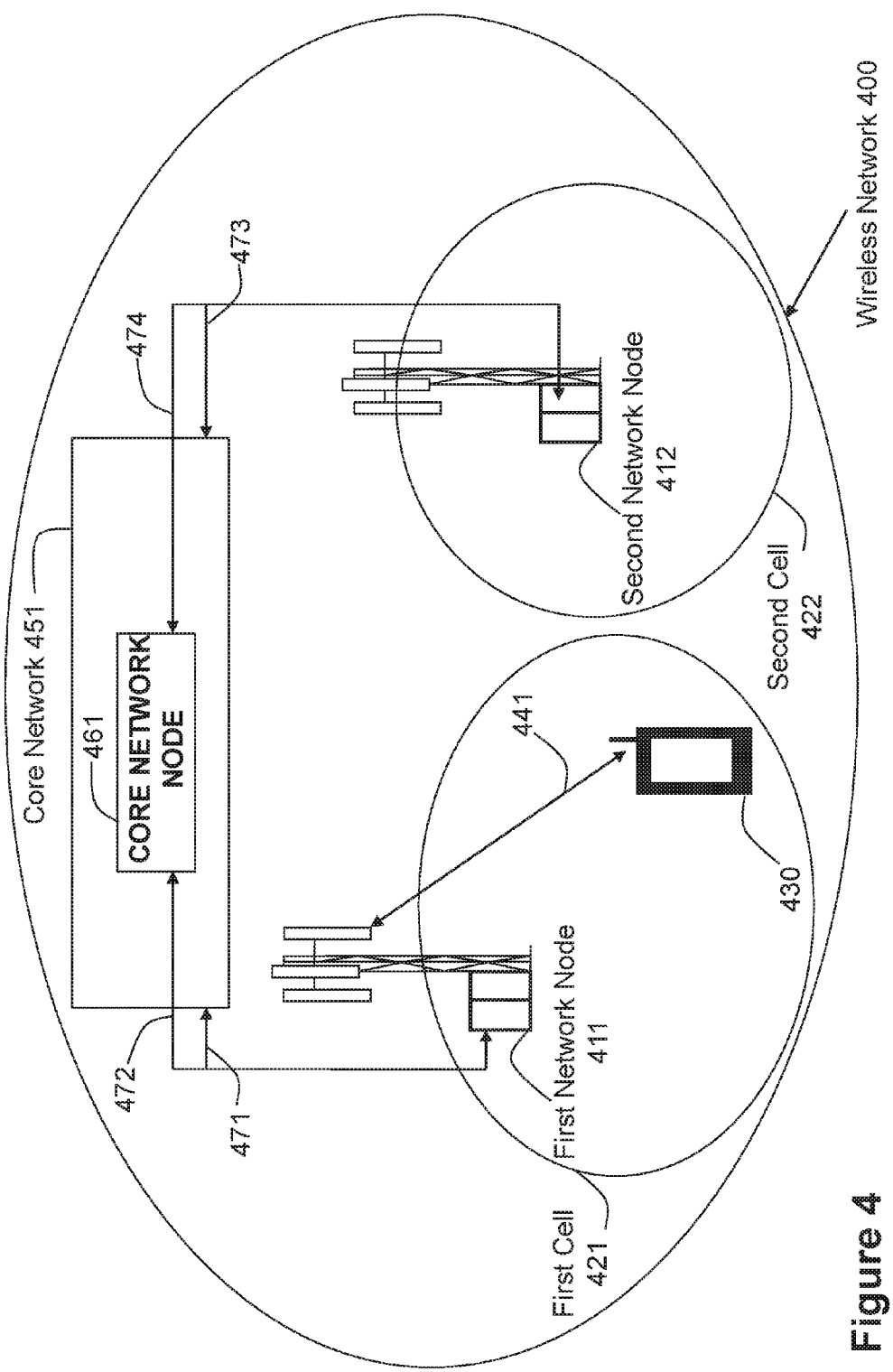
FIG. 4 is a schematic block diagram illustrating embodiments in a wireless communications system.

FIG. 4 depicts a wireless communications network 400, in which embodiments herein may be implemented. The wireless communications network 400 is an LTE wireless communication network.

Wireless communications network 400 may be a heterogeneous network, or a homogeneous network.

The wireless communications network 400 comprises a first network node 411, also referred to herein as network node 411 for the sake of simplicity, and may also comprise a second network node 412. Each of the network node 411 and the second network node 412 may be a base station such as e.g. an eNB, eNodeB, or a Home Node B, a Home eNode B, femto Base Station, BS, pico BS or any other network unit capable to serve a wireless device or a machine type communication device in a wireless communications network 400. In some particular embodiments, each of the network node 411 and the second network node 412 may be a stationary relay node or a mobile relay node. The wireless network 400 covers a geographical area which is divided into cell areas, wherein each cell area is served by a network node, although, one network node may serve one or several cells. In the example depicted in FIG. 4, the network node 411 serves a cell 421, and the second network node 412 serves a second cell 422. Each of the network node 411 and the second network node 412 may be e.g. macro eNodeB, home eNodeB or pico base station, based on transmission power and thereby also cell size. Typically, wireless communications network 400 may comprise more cells similar to 421 and 422, served by their respective network nodes. This is not depicted in FIG. 4 for the sake of simplicity. Each of the network node 411 and the second network node 412 may support one or several communication technologies, and its name may depend on the technology and terminology used. In some embodiments, each of the network node 411 and the second network node 412 may have one or more antenna ports. In some particular embodiments, each of the network node 411 and the second network node 412 may have one to four antenna ports. In other embodiments, each of the network node 411 and the second network node 412 may have more than four antenna ports.

A number of wireless devices are located in the wireless communications network 400. In the example scenario of FIG. 4, only one wireless device is shown, wireless device 430. The wireless device 430 may e.g. communicate with the network node 411 over a radio link 441.

The wireless device 430 is a wireless communication device such as a user equipment (UE), which is also known as e.g. mobile terminal, wireless terminal and/or mobile station. The device is wireless, i.e., it is enabled to communicate wirelessly in the wireless communication network 400, sometimes also referred to as a cellular radio system or cellular network. The communication may be performed e.g., between two devices, between a device and a regular telephone and/or between a device and a server. The communication may be performed e.g., via a Radio Access Network (RAN) and possibly one or more core networks, comprised within the wireless network.

The wireless device 430 may further be referred to as a mobile telephone, cellular telephone, or laptop with wireless capability, just to mention some further examples. The device 430 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a radio link in a cellular communications system.

In 3GPP LTE, network nodes, which may be referred to as eNodeBs or even eNBs, may be directly connected to one or more core networks, such as core network 451. Core network 451 comprises one or more core network nodes, such as core network node 461. Core network node 461 may be for example, a "centralized network management node" or "coordinating node", which is a core network node, which coordinates radio resources with one or more radio network nodes and/or UEs. Some examples of the coordinating node are network monitoring and configuration node, Operations Support System (OSS) node, Operations & Maintenance (O&M) node, Minimization of Drive Tests (MDT) node, Self-Organizing Network (SON) node, positioning node, a gateway node such as Packet Data Network Gateway (P-GW) or Serving Gateway (S-GW) network node or femto gateway node, a Mobility Management Entity (MME) node, a macro node coordinating smaller radio nodes associated with it, etc.

The network node 411 may communicate with core network 451 via a link 471, and with core network node 461 via a link 472. The second network node 412 may communicate with core network 451 via a second link 473, and with core network node via a second link 474.

Figure 5:
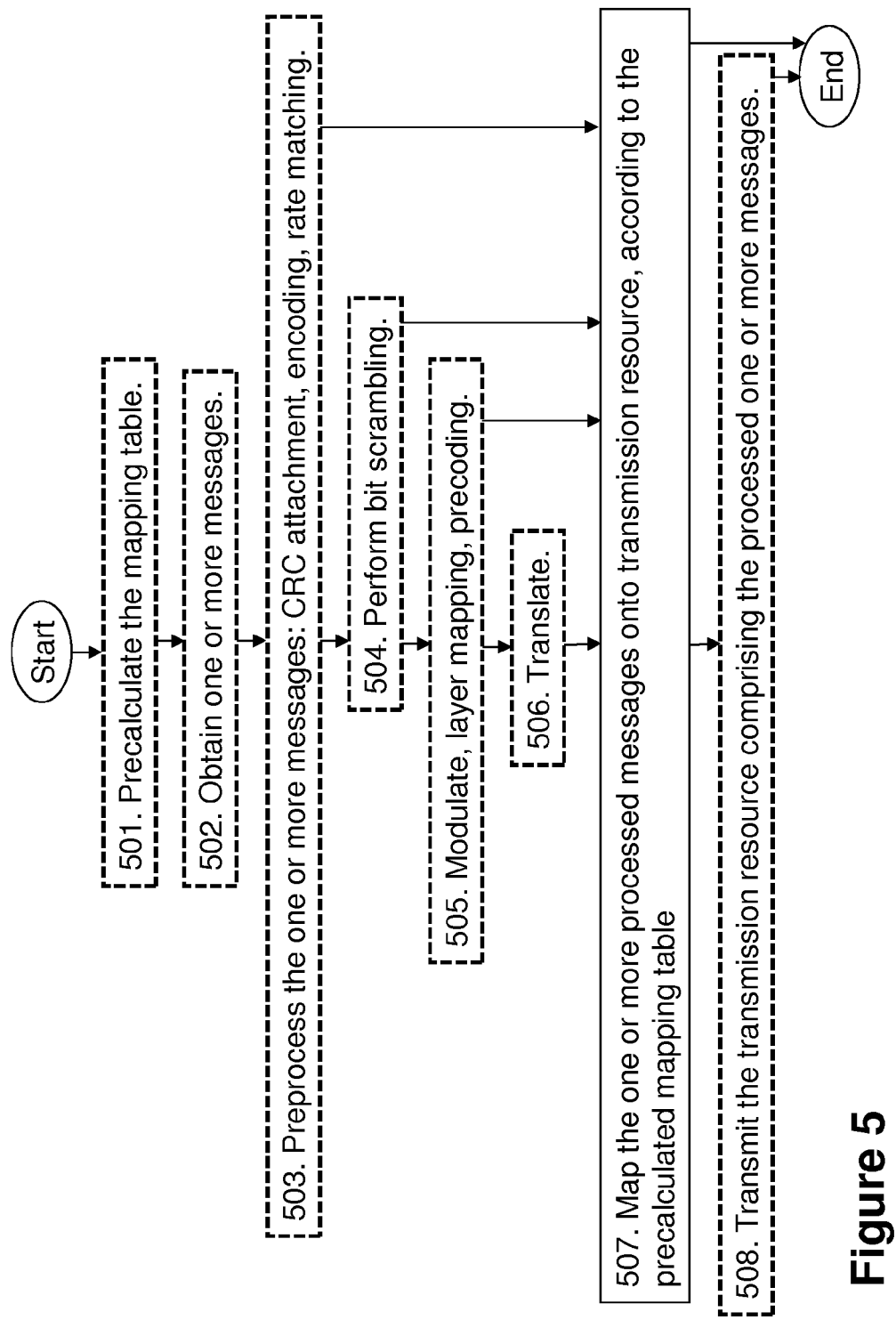
FIG. 5 is a flowchart depicting embodiments of a method in a first network node.

Embodiments of a method in the network node 411 of mapping one or more messages onto transmission resource for transmitting to the wireless device 430, will now be described with reference to the flowchart depicted in FIG. 5 and the schematic diagrams depicted in FIGS. 6-13. The one or more messages are processed by the network node 411, the network node 411 and the wireless device 430 being adapted to be comprised in a wireless communications network 400. FIG. 5 depicts a flowchart of the actions that are or may be performed by the network node 411 in embodiments herein. Discontinued lines depict optional actions. A continuous line depicts a mandatory action.

The method may comprise the following actions, which actions may as well be carried out in another suitable order than that described below. In some embodiments, all the actions may be carried out, whereas in other embodiments only some action/s may be carried out.

In some of the following embodiments, each of the one or more messages may comprise downlink information. In some particular embodiments each of the one or more messages may be a downlink control information message, such as DCI message. In some particular embodiments, the DCI is such as that described in 3GPP TS 36.212, Section 5.3.3. While the description herein may at times focus on particular embodiments wherein the one or more messages comprise DCI, in some other embodiments, the one or more messages may comprise uplink information, and the method described below may be applied in a similar manner, with any pertinent changes corresponding to uplink information, processing, and channels, according to a map such as that described in 3GPP TS 36.212, Section 4.

In some embodiments, transmission resource as used herein is one or more RE groups, as described in 3GPP TS 36.211 Section 6.2.4.

Action 501

In some embodiments, the network node 411 may pre-calculate a mapping table to map one or more processed messages onto a transmission resource. The precalculating may be performed prior to obtaining, e.g., generating or receiving, the one or more messages to be processed and mapped using the mapping table. In some particular embodiments, the precalculating of the mapping table may be performed at cell set up. In other particular embodiments, the precalculating of the mapping table may be performed after a reboot of the network node 411. In other embodiments, the precalculating of the mapping table may be performed upon cell reconfiguration, that is, upon cell configuration without taking down the cell.

In some embodiments, the precalculated mapping table comprises a map of indexed information in the transmission resource. The indexed information may comprise one or more indexes, as described later, and the transmission resource may comprise one or more transmission units, i.e., transmission resource units. Each of the one or more indexes of the indexed information may be allocated a transmission resource unit. In some particular embodiments, each of the one or more transmission resource units is an RE group, as described above.

Each of the one or more indexes in the indexed information corresponds to indexing information comprised in the one or more messages, that may be mapped onto the transmission resource according to the precalculated table, as will be described later. For example, in the embodiments where the one or more messages are DCI messages, the indexing information may correspond, for each DCI message, to both, the index of the first Control Channel Element (CCE), and the number of CCEs to be used by that DCI message. In other alternative examples, instead of the number of CCEs to be used by that DCI message, the number of bits may be used, e.g., 72 bits in a CCE, together with the index of the first CCE, so a bit location may be determined, e.g., CCE index*72. Yet in other alternative examples, where the one or more messages are DCI messages, instead of the number of CCEs to be used by that DCI message, the number of quadruplets may be used, e.g., 9 in a CCE, together with the index of the first CCE, so a quadruplet location may be determined, e.g., CCE index*9. In other embodiments, the indexing information may be comprised in other one or more messages, i.e., messages not to be mapped onto the transmission resource. These embodiments will be equivalent to those wherein indexing information comprised in the one or more messages, that may be mapped onto the transmission resource are used.

In some embodiments, the indexed information comprises one or more indexed information units, each with its corresponding index of the one or more indexes. Indexed information units are also referred herein as processed information units. In some embodiments, the indexed information units may be parts of rate matched bit sequences, as obtained in action 503. In other embodiments, the processed information units may be parts of scrambled bit sequences, as obtained in action 504. In other embodiments, the processed information units may be parts of sequences, as obtained in action 505. In yet other embodiments, the processed information units may be parts of modulated sequences, i.e., modulation scheme units, as obtained in action 506.

Thus, in some particular embodiments, the precalculated mapping table, is a mapping table of indexed modulation scheme units. In some particular embodiments, the indexed modulation scheme units are indexed quadruplets. Thus, in some particular embodiments, the precalculated mapping table, is a quadruplets mapping table, wherein the quadruplets are associated with a QPSK modulation scheme, derived as described in 3GPP TS 36.211 Section 6.8.3. Embodiments herein are described using indexed modulation scheme units that are quadruplets, as a non-limiting illustrative example.

The one or more messages may be processed according to actions 503-507 described below.

One of the technical benefits of this precalculating action is that by pre-calculating the mapping tables prior to obtaining the one or more messages, e.g., at cell setup, the amount of required real-time processing is reduced, thereby reducing the required processing capacity of the system. As opposed to the prior art method described in FIGS. 1-3, embodiments of the method described herein comprise a pre-calculation of a mapping table to map one or more processed messages onto a transmission resource, prior to the generation the one or more messages, which may be reused for many different messages generated over extended periods of time.

Further details on how action 501 is implemented may be found further down.

Action 501 is optional. In some alternative embodiments, the precalculating may be performed, as described, by core network node 461, and the precalculated mapping table then sent to the network node 411. In other alternative embodiments, the precalculating may be performed, as described, by the second network node 412, and the precalculated mapping table then sent to the network node 411. Thus, in these embodiments, the network node 411 may receive the precalculated mapping table from one of the second network node 412 and the core network node 461 in an action not shown.

Action 502

In this action, the network node 411 may obtain the one or more messages. In some embodiments, obtaining comprises generating the one or more messages. In these embodiments, if each of the one or more messages are DCI messages, the information may be generated in a scheduler circuit in the network node 411, e.g., a MAC scheduler.

In some other embodiments, obtaining comprises receiving the one or more messages from another network node in the wireless communications network 400, such as the second network node 412. In these embodiments, if each of the one or more messages are DCI messages, the information may be received from a scheduler circuit in the second network node 412, e.g., a MAC scheduler.

Thus, in some embodiments, the network node 411 may obtain the one or more messages upon scheduling of downlink control information. For example, the network node 411 may obtain the one or more messages upon scheduling of DL user data, upon scheduling of UL user data, upon scheduling of system information, or upon scheduling of power control messages.

This is an optional action.

Action 503

In this action, the network node 411 may preprocess the one or more messages to encode the one or more messages into a channel. In some embodiments, the preprocessing is performed independently, i.e., separately, for each of the one or more messages. In these embodiments, preprocessing independently comprises preprocessing each of the one or more messages in parallel. In other embodiments, each of the one or more messages may be preprocessed at least partially in parallel, i.e., the preprocessing does not happen at the same time for each one of the one or more messages, but at different time points depending, for example, on their location on a queue. This is an optional action.

In the embodiments in which the one or more messages comprise downlink information, which is downlink control information such as one or more DCI messages, the channel may be a PDCCH, as described above.

In some particular embodiments, the preprocessing comprises one or more of: CRC attachment, encoding, and rate matching, i.e., Step 1 in FIG. 7. In some further particular embodiments, each of the CRC attachment, encoding, and rate matching are performed similarly to the description provided in 3GPP TS 36.212, Section 5.3.3, with the distinction that each of the one or more messages may be preprocessed independently in each one of the CRC attachment, encoding, and rate matching.

The technical effect of preprocessing each of the one or more messages independently, e.g., in parallel, is that the implementation scales well with the number of one or more messages, such as DCI messages. The processing delay is independent of the number of one or more messages.

In some embodiments, one or more processed messages, as utilized herein, may comprise, one or more messages that have undergone rate matching according to action 503. In these embodiments in which the one or more processed messages are one or more messages that have undergone rate matching, the mapping action described in action 508 may be done "on the fly", i.e., along with, the actions described in actions 504, 505 and 506. This is not depicted in FIG. 5.

Action 504

Figure 7:
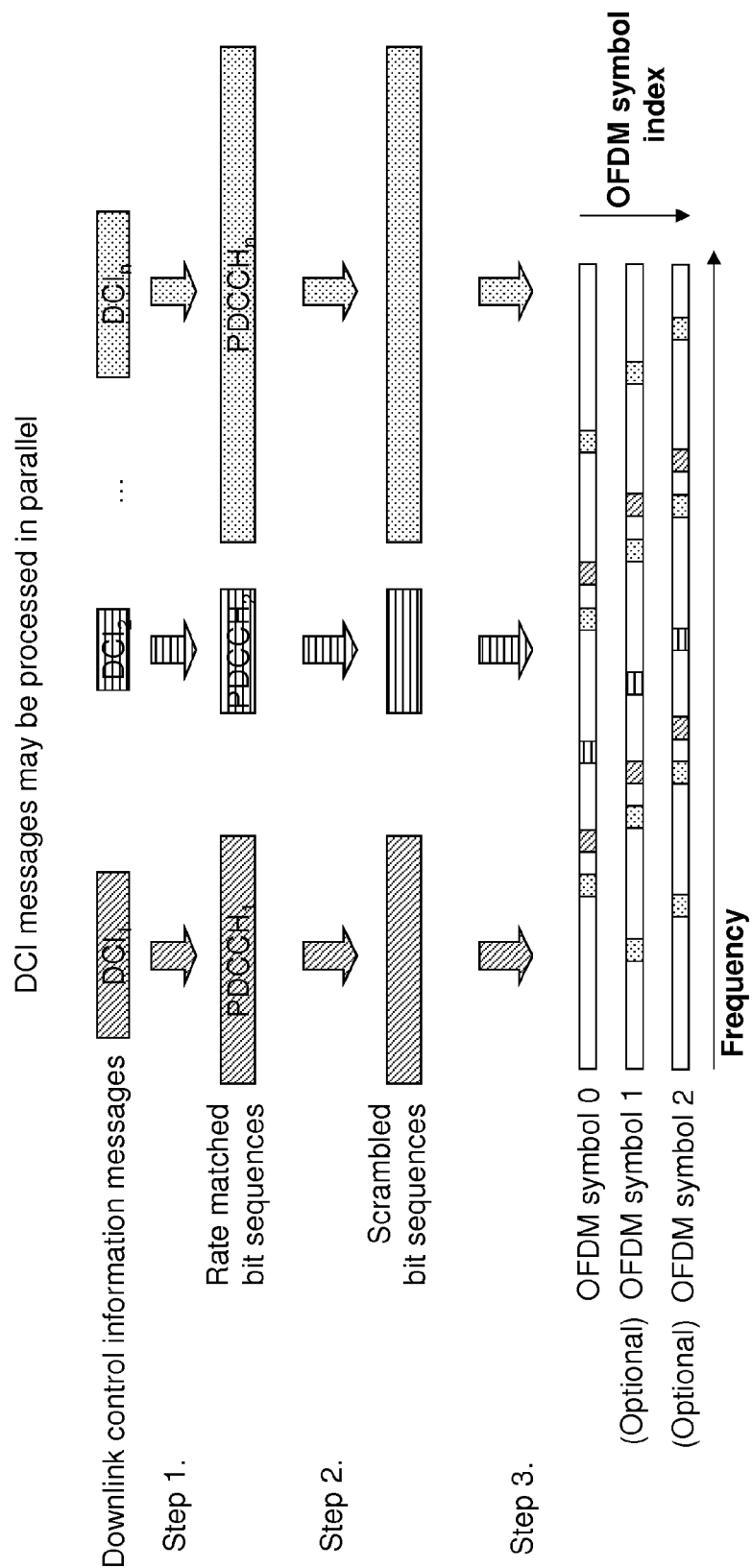
FIG. 7 is a schematic representation illustrating embodiments of a method in the first network node, wherein Downlink Control Information (DCI) messages are processed in parallel.

In this action, the network node 411 may perform bit scrambling on the preprocessed one or more messages, i.e., Step 2 in FIG. 7. In some further particular embodiments, this is performed according to 3GPP TS 36.211 Section 6.8.2. In some embodiments this action may be performed, independently, i.e., separately, e.g., in parallel, for the one or more preprocessed messages. In some of these embodiments, this action may be performed at least partially in parallel, as described above. In some particular embodiments, this is done using only relevant parts of the scrambling sequence. In some embodiments, the relevant parts may be the parts of the scrambling sequence comprising the indexing information, as described before. That is, the information according to which, a part of the one or more messages, once processed as described herein, may be assigned a certain index in the mapping table. This is an optional action.

In some embodiments, one or more processed messages, as utilized herein, may comprise, one or more messages that have undergone bit scrambling according to action 504. In these embodiments in which the one or more processed messages are one or more messages that have undergone bit scrambling, the mapping described in action 508 may be done "on the fly" with the actions described in actions 505 and 506. This is not depicted in FIG. 5.

Action 505

In this action, the network node 411 may modulate the scrambled preprocessed one or more messages, i.e., part of Step 3 in FIG. 7. In some further particular embodiments, this is performed according to 3GPP TS 36.211 Section 6.8.3, independently for each one of the scrambled preprocessed one or more messages. In some embodiments this action may be performed, independently, i.e., separately, e.g., in parallel, for the one or more scrambled preprocessed messages. In some of these embodiments, this action may be performed at least partially in parallel, as described above.

In some particular embodiments, the network node 411, in this action, may further perform layer mapping on the modulated scrambled preprocessed one or more messages according to 3GPP TS 36.211 Section 6.8.4 (part of Step 3 in FIG. 7). In some embodiments this action may be performed, independently, i.e., separately, e.g., in parallel, for the modulated scrambled preprocessed one or more messages. In some of these embodiments, this action may be performed at least partially in parallel, as described above.

The network node 411, in this action, may further perform precoding on the layer mapped modulated scrambled preprocessed one or more messages according to 3GPP TS 36.211 Section 6.8.4 (part of Step 3 in FIG. 7). This action may be performed, independently, i.e., separately, e.g., in parallel, for the layer mapped modulated scrambled preprocessed one or more messages. In some of these embodiments, this action may be performed at least partially in parallel, as described above.

This is an optional action.

One or more processed messages, as utilized herein, may comprise, one or more messages that have undergone modulation, layer mapping or precoding according to action 505. In these embodiments in which the one or more processed messages are one or more messages that have undergone modulation, layer mapping or precoding, the mapping described in action 508 may be done "on the fly" with the actions described in action 506. This is not depicted in FIG. 5.

Action 506

In this action, the network node 411 may translate groups of bits from the modulated and/or layer mapped and/or precoded, scrambled preprocessed one or more messages into modulation scheme units, i.e., part of Step 3 in FIG. 7. This action may be performed, independently, i.e., separately, e.g., in parallel, for the modulated and/or layer mapped and/or precoded, scrambled preprocessed one or more messages. In some of these embodiments, this action may be performed at least partially in parallel, as described above. The network node 411 may translate groups of bits to modulation scheme units, according to the modulation scheme used for each one of the one or more messages, and the number of complex symbols available per modulation scheme unit. For example, in the embodiments in which the modulation scheme used for the translation is QPSK, derived as described in 3GPP TS 36.211 Section 6.8.3 and 7.1.2, and there are four complex symbol groups, groups of 8 bits are translated to quadruplets. In some contexts, translating may be referred to as mapping bits to complex-valued modulation symbols.

In some embodiments, one or more processed messages, as utilized herein, may comprise, one or more messages that have undergone translation according to action 506. An example of such embodiments is illustrated in FIGS. 7-12.

Action 507

In this action, the network node 411 maps the one or more processed messages onto the transmission resource, according to the indexing information comprised in the one or more messages and to the precalculated mapping table described in action 501. That is, in some embodiments, the precalculated mapping table according to which the mapping of the one or more messages is done by the network node 411, may be precalculated by the network node 411 itself, while in some other embodiments the precalculated mapping table may be precalculated by one of the second network node 412 or core network node 461 and then sent to the network node 411. Action 507 also part of Step 3 in FIG. 7. As stated earlier, the precalculated mapping table is calculated prior to obtaining the one or more messages to be mapped. In some embodiments this action may be performed, independently, i.e., separately, e.g., in parallel, for the one or more processed messages. In some of these embodiments, this action may be performed at least partially in parallel, as described above.

In some embodiments, the indexing information comprised in the one or more messages is maintained throughout the processing of the one or more messages according to actions 503-506. Thus, each one of the one or more processed messages may also comprise the indexing information.

According to this indexing information, a part of the one or more messages, e.g., 8 bit parts in the examples of FIGS. 7-12, once processed as described in any of the actions 503-506, may be mapped by the network node 411 to the corresponding table index in the mapping table, e.g., the quadruplet mapping table. That is, in this embodiment, groups of 8 bits that have been translated to quadruplets, e.g., groups of 4 complex symbols, are written to the appropriate locations in the OFDM symbol buffers. The locations may be determined using the pre-calculated quadruplet mapping table. The antenna dimension is not shown in FIG. 7. That means, as stated earlier, that in the case, for example, that two antenna ports were used, one precoded quadruplet sequence may be generated for each of the antenna ports.

Figure 9:
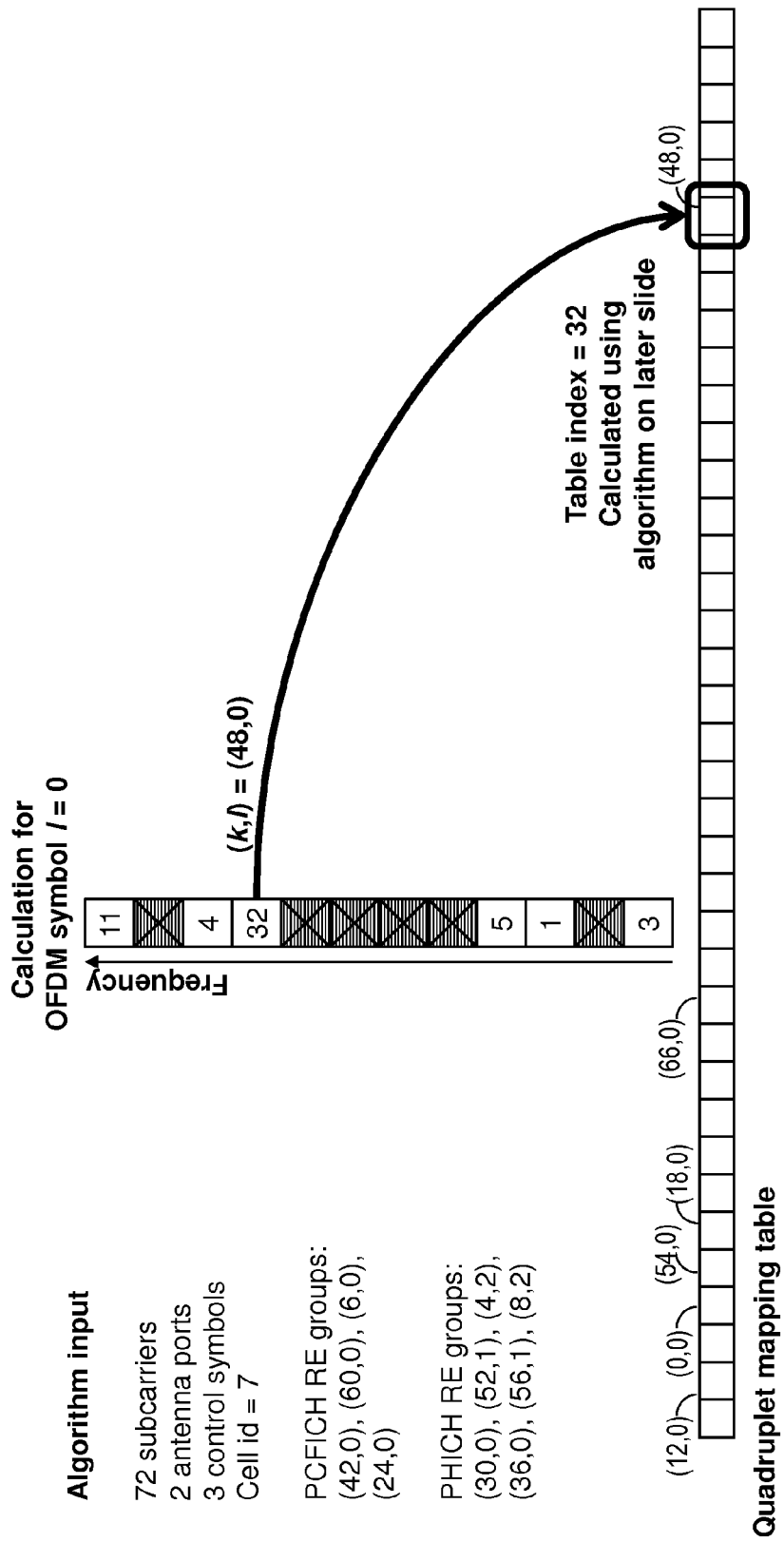
FIG. 9 is a schematic representation of embodiments of a precalculating action of a mapping table using a frequency-first algorithm.

For example, following the example in FIG. 9, the part of the processed one or more messages comprising indexing information 32 may be mapped by the network node to the transmission resource unit corresponding to table index 32, i.e., table mapping unit number 32, starting at 0, and counting from the left. This automatically corresponds to the transmission resource unit, i.e., location, or RE group, (48,0) in OFDM symbol 0, which may be used by the network node 411 for transmission of this part of the processed one or more messages.

Figure 10:
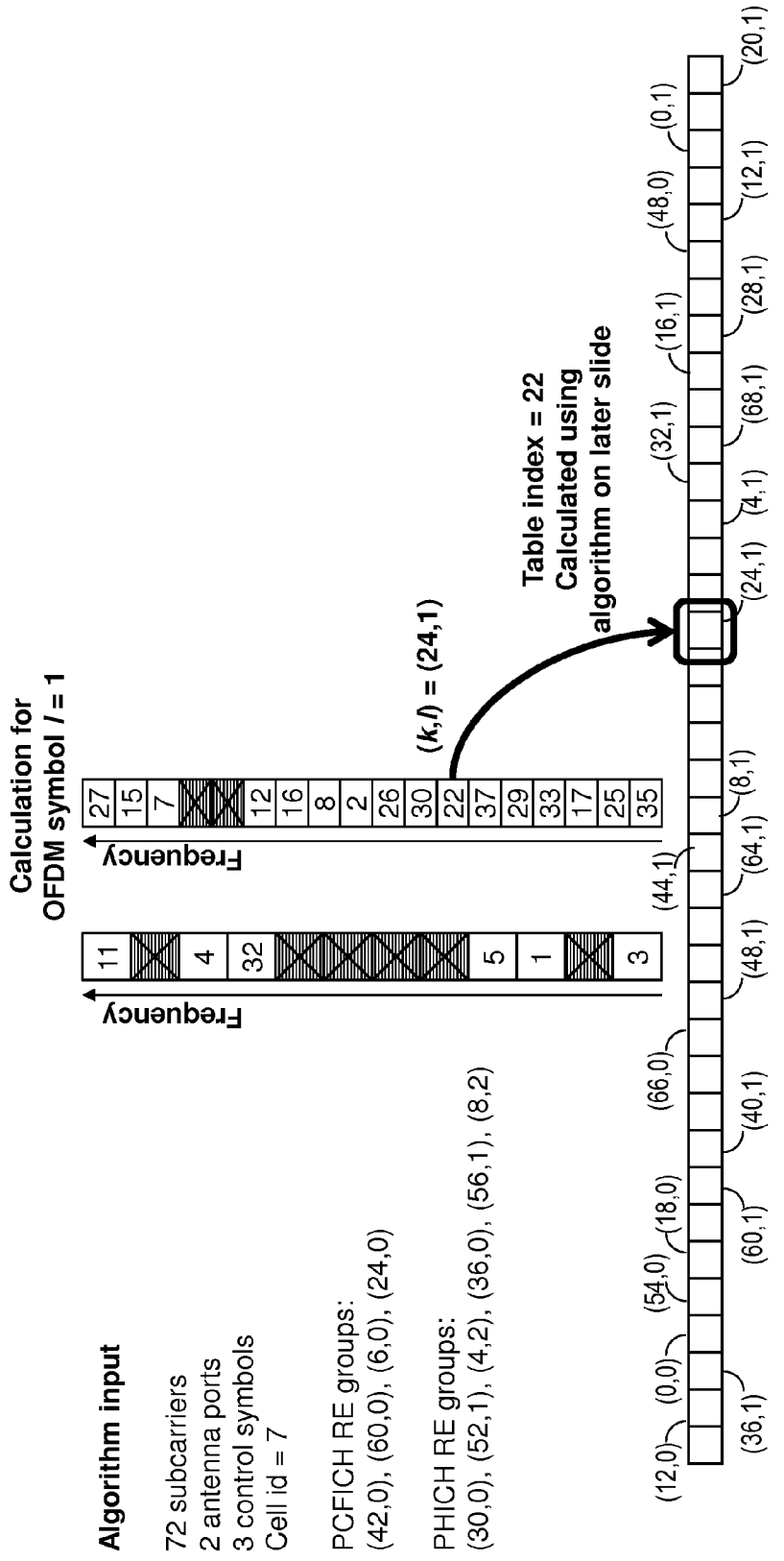
FIG. 10 is a schematic representation of embodiments of a precalculating action of a mapping table using a frequency-first algorithm.
Figure 11:
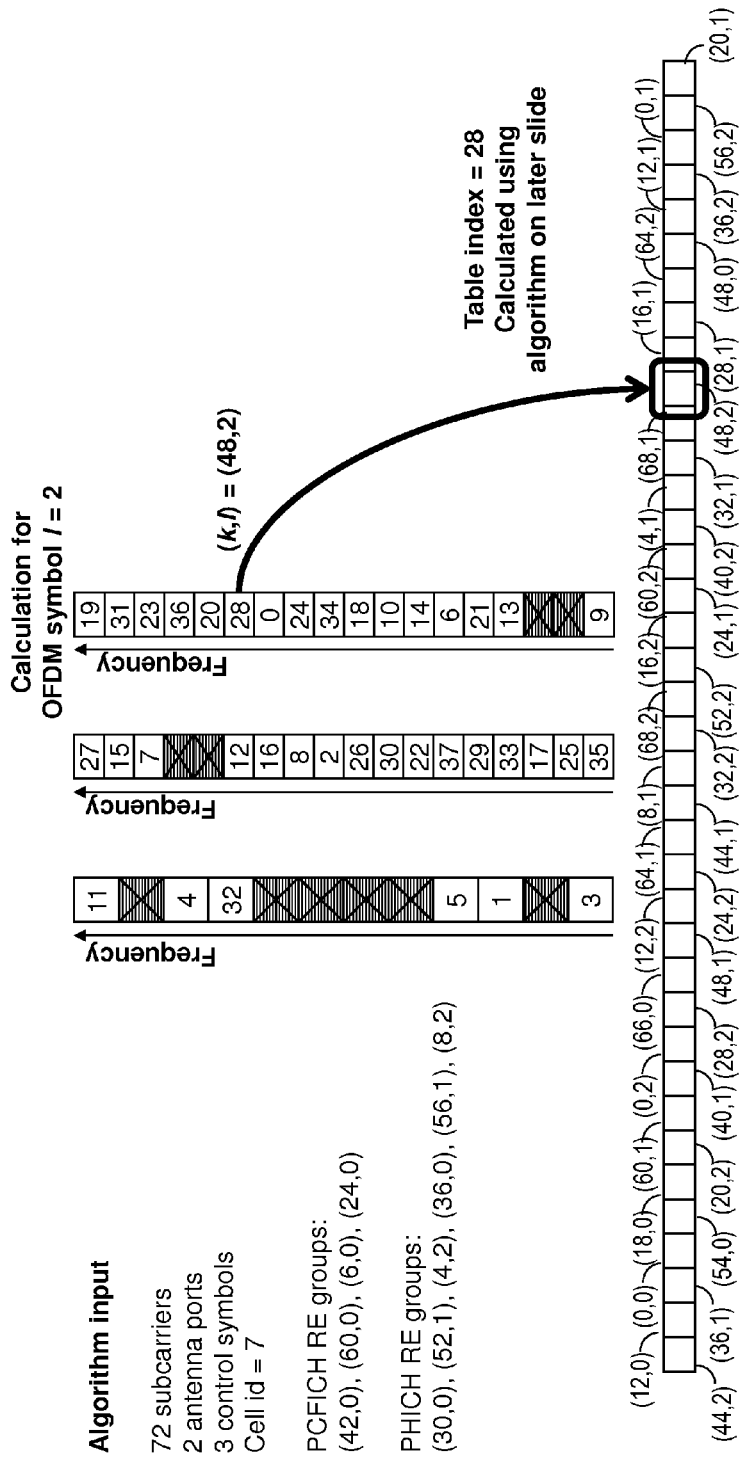
FIG. 11 is a schematic representation of embodiments of a precalculating action of a mapping table using a frequency-first algorithm.

A similar description applies to FIGS. 10 and 11.

As has been described in actions 503-506, the one or more processed messages comprise the one or more messages, that have undergone at least one of the following actions by the network node 411: preprocessing 503 the one more messages to encode the one or more messages into a channel, performing 504 bit scrambling on the preprocessed one or more messages, modulating 505 the scrambled preprocessed one or more messages, performing 505 layer mapping on the modulated scrambled preprocessed one or more messages, performing 505 precoding on the layer mapped modulated scrambled preprocessed one or more messages, and translating 506 groups of bits from the modulated and/or layer mapped and/or precoded, scrambled preprocessed one or more messages into modulation scheme units.

As just stated, in some embodiments, the transmission resource comprises one or more units, e.g., RE groups. In some embodiments, the transmission resource also comprises one or more transmission resource unit groups, and the mapping table is precalculated on a time transmission resource unit group-by-transmission resource unit group unit basis. In some particular embodiments, the one or more transmission resource unit groups are OFDM symbols, as explained earlier.

In some embodiments, the mapping 507 is performed using a frequency-first algorithm, whereby the mapping of processed information to transmission resource units, e.g., RE groups, is done, for each time transmission resource unit group, e.g., symbol, by frequency carrier, in ascending order. That is, in the embodiments using the frequency-first algorithm, the processing of all frequencies in one symbol is done before continuing to the next symbol, in a determined order, e.g., an ascending order, a descending order, or another determined order, which is not ascending and not descending.

Action 508

In this action, the network node 411 may transmit the transmission resource comprising the processed one or more messages. In some particular embodiments, the transmission resource may be transmitted to the wireless device 430 through the radio link 341.

In some embodiments, transmission may occur periodically, such as, for example, every 1 millisecond (ms).

Figure 6:
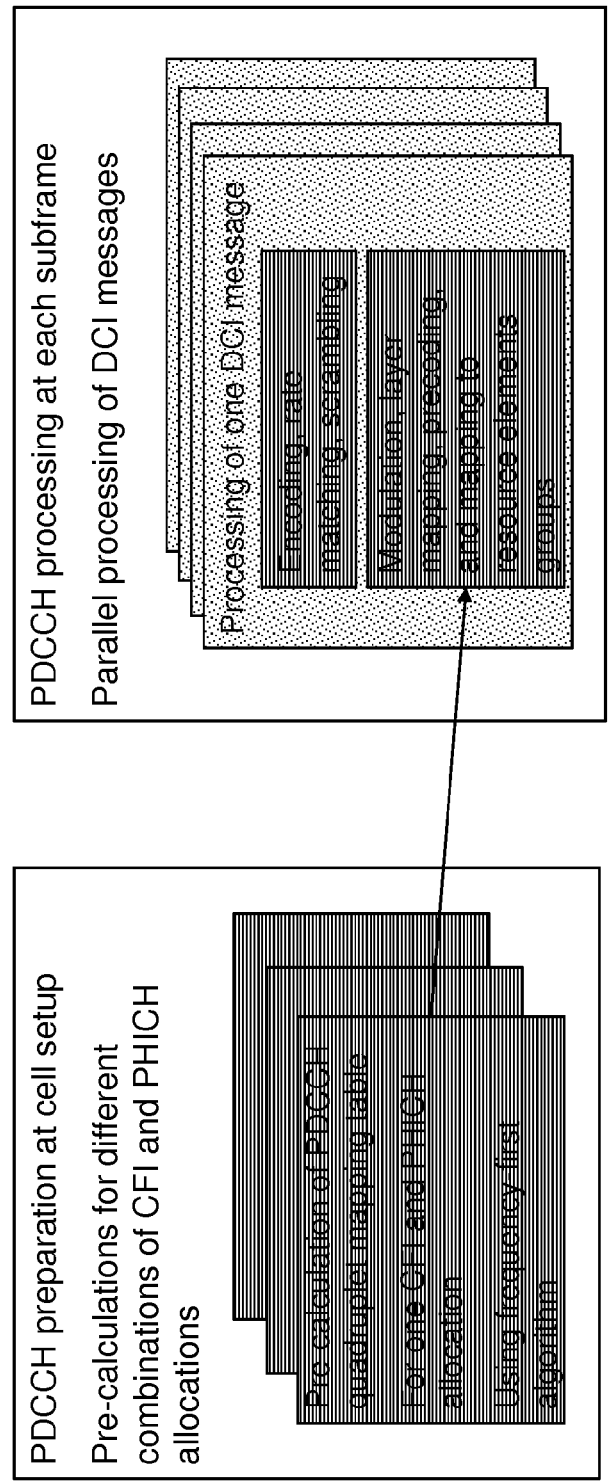
FIG. 6 is a schematic block diagram illustrating an overview of embodiments of a method in the first network node.

FIG. 6 depicts a schematic overview of an example of some embodiments disclosed herein, wherein the one or more messages are DCI messages to be comprised in a PDCCH. The block on the left summarizes the preparations that may take place, in this example, at cell setup. That is, the precalculations of one or more mapping tables, in this example, PDCCH quadruplet mapping tables. Each of the precalculations may be for different combinations of CFI and PHICH allocations, using a frequency-first algorithm. The box on the right summarizes the processing of the DCI messages according to methods disclosed herein. The PDCCH processing takes place at each subframe. Each one of the DCI messages may be processed in parallel. During the processing of each DCI message, the message undergoes encoding, rate matching, scrambling, modulation, layer mapping, precoding, and mapping to resource element groups, as described above. Thus, the mapping to resource element groups is performed according to the PDCCH quadruplet mapping table already pre-calculated at cell set-up.

FIG. 7 depicts a schematic representation of the actions that are or may be performed by the network node 411 in embodiments herein, corresponding to the flowchart depicted in FIG. 5.

Further details on how action 501 may be implemented will be now provided.

In some embodiments, the precalculating action comprises three further actions, as further detailed below:
an initializing action;
a looping action; and
a calculating action of an index for transmission resource units.

FIG. 8a-12, are schematic representations of embodiments of the precalculating action described herein, in action 501. In particular, in the non-limiting embodiments depicted in these figures, the transmission resource comprises units which are RE groups in one or more transmission resource unit groups. The one or more transmission resource unit groups, in the non-limiting embodiments depicted in these figures, are OFDM symbols, and the one or more messages are comprised in a PDCCH, such as that described in 3GPP TS 36.211 Section 6.8.

Figure 8A:
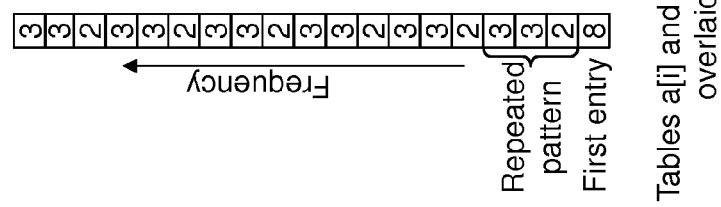
Figure 8B:
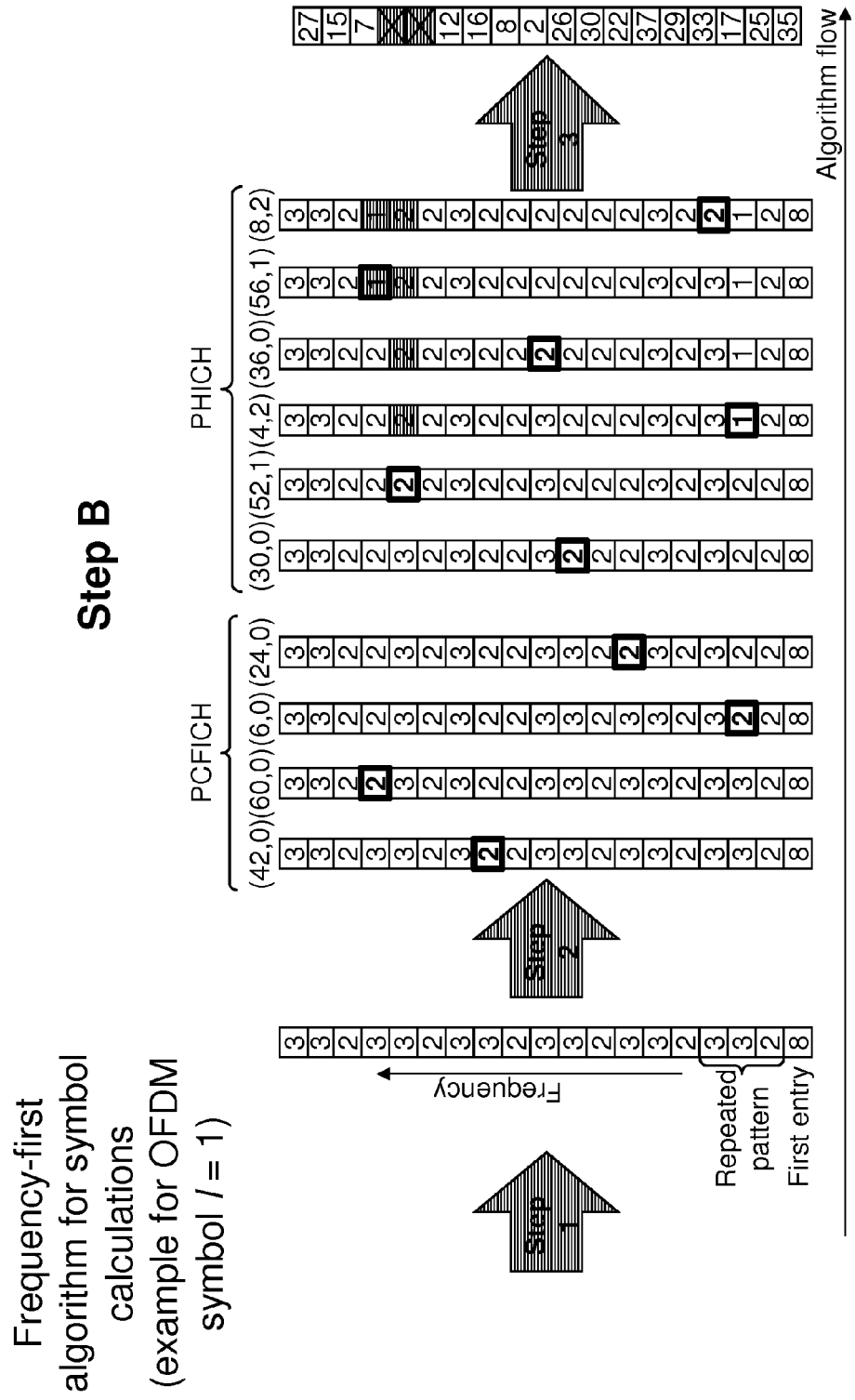

FIGS. 8a-c provide a detailed description of the precalculating actions carried out for an OFDM symbol 1, in a particular illustrative example. In this particular example, the inputs are 72 subcarriers, 2 antenna ports, 3 control symbols, and a Cell id=7, as shown in FIG. 8a. Also in this particular example, the PCFICH is allocated to RE groups (42,0), (60,0), (6,0), (24,0) in the OFDM symbols, and PHICH is allocated to (30,0), (52,1), (4,2) (36,0), (56,1), (8,2).

501.Step A (A) Initializing action, as shown in the example of FIG. 8a

501.A.1 As part of the initializing action, the network node 411 may first create frequency index tables a[i] and b[i], this last one being overlaid over index table a[i] in the Figure. That is, table a[i] is represented in the Figure by the numbers, and table b[i] is represented in the Figure by the background, i.e., patterned, or lack of pattern. Each of these tables may comprise one entry per transmission resource unit, such as RE group, in a transmission resource unit group, such as an OFDM symbol in this example, plus one, which is depicted as "First entry". The First entry may be numbered as entry 0;

501.A.2 Next, the network node 411 may initialize the first entry a[0] with the transmission resource unit group number, such as OFDM symbol number plus an offset, such as, for example, the cell identity, e.g., 1+7=8 in this example, modulo the number of resource element groups for PDCCH;

501.A.3 The network node 411 may then fill the rest of table a[i] with a repeated initialization pattern, according to a corresponding: Control Format Indicator (CFI), number of antenna ports, OFDM symbol number, number of REs in one RE group (d), as shown in Table 1 provided below, and also reproduced in FIG. 8a.

501.A.4 The network node 411 may then initialize table b[i] with logical false.

TABLE 1

| CFI | Number of antenna ports | OFDM symbol number | d | Repeated pattern |
|---|---|---|---|---|
| 1 | 1, 2, or 4 | 0 | 6 | 1 |
| 2 | 1 or 2 | 0 | 6 | 3, 2 |
|   |   | 1 | 4 | 1, 2, 2 |
|   | 4 | 0 | 6 | 2 |
|   |   | 1 | 6 | 2 |
| 3 | 1 or 2 | 0 | 6 | 5, 3 |
|   |   | 1 | 4 | 2, 3, 3 |
|   |   | 2 | 4 | 2, 3, 3 |
|   | 4 | 0 | 6 | 4, 3 |
|   |   | 1 | 6 | 4, 3 |
|   |   | 2 | 4 | 1, 3, 3 |
| 4 | 1 or 2 | 0 | 6 | 7, 4 |
|   |   | 1 | 4 | 3, 4, 4 |
|   |   | 2 | 4 | 3, 4, 4 |
|   |   | 3 | 4 | 3, 4, 4 |
|   | 4 | 0 | 6 | 6, 4 |
|   |   | 1 | 6 | 6, 4 |
|   |   | 2 | 4 | 2, 4, 4 |
|   |   | 3 | 4 | 2, 4, 4 |

501.Step B Looping action, as shown in the example of FIG. 8b

The network node 411 may then loop through transmission resource units, e.g., RE groups (k',l'), used by channels comprising other information, such as PCFICH or PHICH in the embodiments in which the one or more messages to be mapped are downlink messages, e.g., DCI messages, to be comprised in a PDCCH, and perform the following further actions:

The network node 411 may calculate frequency index i as $$i = \lfloor (k'-s)/d \rfloor$$

where s=1 if l'<1 and s=0 otherwise, and d is the number of REs in one RE group. In the example depicted in FIG. 8b, for PCFICH RE group (42,0), i=10;

The network node 411 may then decrement table entry a[i+1] by 1. In the example depicted in FIG. 8b, for PCFICH RE group (42,0), entry a[10+1], which is "3", is decremented by 1 to "2", as framed in bold;

Additionally, if l'=l, i.e., the PCFICH or PHICH RE group is in the OFDM symbol, the network node 411 may flag entry i as blocked by setting b[i] to true. This is depicted in FIG. 8b by the RE groups with striped backgrounds.

501.Step C Calculating action of an index for transmission resource units, as shown in the example of FIG. 8c The network node 411 may then calculate an index for each of the transmission resource units. In some particular embodiments, the calculating is performed in a frequency-first order. In the example depicted in FIG. 8c, the index is a quadruplet index, and the transmission resource units are RE groups, so a quadruplet index is calculated for each RE group. In some particular embodiments, the calculation may be performed according to the following algorithm, which is written in C language in this example:

```
// Let M = number of REGs this symbol
// Let N = total number of REGs for PDCCH
// bitrev(w,n) reverses the bits in an n-bit word
K = (N + 31) >> 5;
S = (K << 5) - N;
r = 16;
kk = K; if (bitrev(r,5) < S) kk--;
j = 0;
for (i = 0; i < M; i++) {
    j = j + a[i];
    while (j >= kk) {
        j -= kk;
        r = (r + 1) & 31;
        kk = K; if (bitrev(r,5) < S) kk--;
    }
    if (!b[i]) { // if REG not blocked
        r2 = bitrev(r,5);
        if (r2 < S) p = 1; else p = 0;
        j_out = r2 - S + ((j + p) << 5);
        // j_out is the quadruplet index for REG i
    }
}
```

Figure 12:
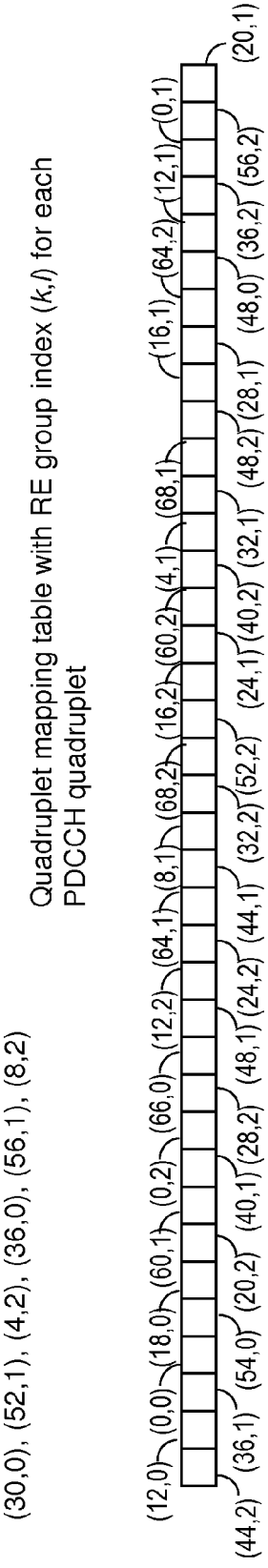
FIG. 12 is a schematic representation of embodiments of a precalculating action of a mapping table using a frequency-first algorithm.

Once actions 501.1, 501.2 and 501.3 have been performed for each of the transmission resource unit groups, e.g., for each one of the OFDM symbols allocated to transmit the one or more processed messages, each of the indexes in the mapping table, e.g., in the quadruplet mapping table, may correspond to a particular location, i.e., a transmission resource unit, e.g., an RE group, in each of the transmission resource unit groups, e.g., in each one of the OFDM symbols. This is shown in the illustrative examples of FIGS. 9-11, symbol by symbol, and the final map is shown in FIGS. 11 and 12. For example, FIG. 9 shows how the RE group in the OFDM symbol 0 corresponding to subcarrier index 48, is mapped to index 32 in the quadruplet mapping table. Each of the one or more messages comprises indexing information. According to this indexing information, a part of the one or more messages, e.g., 8 bit parts in the examples of FIGS. 7-12, once processed as described in any of the actions 503-506 above, may be assigned a certain table index in the mapping table, e.g., the quadruplet mapping table. For example, in FIG. 9, Table index 32 corresponds to the mapping table unit number 32, starting at 0, and counting from the left. The pre-calculated table just described may then allow the network node 411 to allocate a certain index in the mapping table, e.g., the quadruplet mapping table, to a certain transmission resource unit, e.g., an RE group in each of the transmission resource unit groups, e.g., in each one of the OFDM symbols. A similar description applies to FIGS. 10 and 11, which show examples of the correspondence between an index in the quadruplet mapping table and the location in OFDM symbol 1 in FIG. 10, and OFDM symbol 2 in FIG. 12. Thus, as shown in the example of FIG. 10, the RE group in the OFDM symbol 1 corresponding to subcarrier index 24, is mapped to index 22 in the quadruplet mapping table. Similarly, as shown in the example of FIG. 11, the RE group in the OFDM symbol 2 corresponding to subcarrier index 48, is mapped to index 28 in the quadruplet mapping table.

In other embodiments in which the indexed information units may be parts of rate matched bit sequences, as obtained in action 503, or parts of scrambled bit sequences, as obtained in action 504, or parts of sequences, as obtained in action 505, none of which are illustrated, the indexing information may be also be used to assign a certain table index in the mapping table to each one of the indexed information units.

In some embodiments, the network node 411 may pre-calculate one or more additional mapping tables, as described above. In some embodiments, each one of the one or more additional mapping tables may be precalculated by the network node 411 for each one of the number of control symbols allocated. In the examples illustrated in FIG. 8a-12, the number of control symbols is 3. In other embodiments, each one of the one or more additional mapping tables may be precalculated by the network node 411 for each one of the number of RE groups allocated to the PHICH. In the examples illustrated in FIG. 8a-12, the number of RE groups allocated to the PHICH is 6.

In some embodiments, the table pre-calculation is performed on a time/frequency unit-by-time/frequency unit, i.e., a transmission resource unit group-by-transmission resource unit group, e.g., symbol-by-symbol, basis. Another of the technical benefits of this precalculating action is that by calculating the tables in frequency-first order, i.e., using a frequency-first algorithm, less information needs to be stored during the processing, reducing both processing delay and memory requirements.

Some of the advantages of some of embodiments presented herein are: that the parallel processing of the one or more messages, such as the DCI messages, allows the network node 411 to handle many messages, e.g., DCI messages, without impacting the processing delay. Another advantage is that pre-calculation of the mapping table, e.g., the PDCCH quadruplet mapping table, reduces the amount of processing in real-time. A further advantage is that the frequency-first, transmission resource unit group-by-transmission resource unit group, e.g., symbol-by-symbol, algorithm may reduce both the processing time and the memory consumption during table pre-calculation. Yet a further advantage may be that the new implementation also leverages the parallelism of multi-core hardware.

Figure 13B:
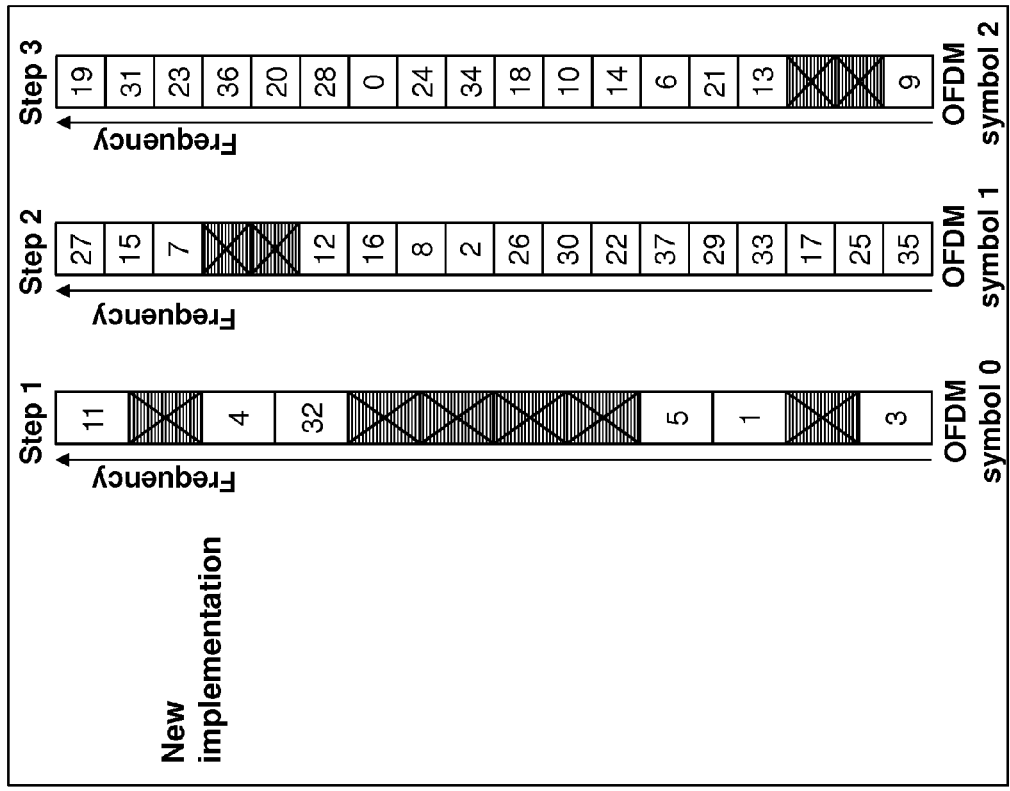
FIG. 13b is a schematic representation of a method in the first network node.
Figure 13A:
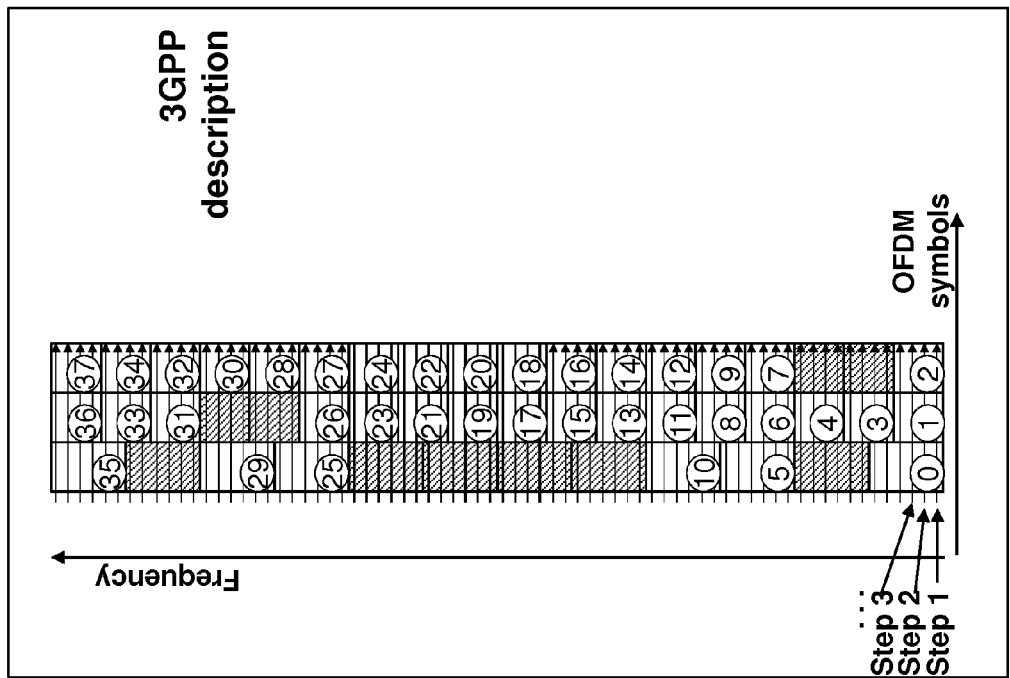
FIG. 13a is a schematic representation of a method according to known methods.

FIGS. 13a-b show a comparison of an embodiment of the method disclosed herein, i.e., the new implementation, FIG. 13b, with that of the prior art, i.e., the 3GPP description, FIG. 13a. The example provided for the embodiment of the method disclosed herein corresponds to that described in FIG. 8a-12. As may be appreciated in FIG. 13a, the prior art method performs an allocation of processed information to transmission resource units, e.g., RE groups, for each frequency subcarrier, sequentially for each time transmission resource unit group, e.g., symbol, in ascending order. The new implementation described herein and in FIG. 13b, uses a frequency-first algorithm, whereby the mapping of processed information to transmission resource units, e.g., RE groups, is done, for each time transmission resource unit group, e.g., symbol, by frequency carrier, in e.g., ascending order. The allocation according to the new implementation is not sequential, but performed according to the disclosed algorithm. Moreover, according to the new implementation, the mapping is done according to a table that is pre-calculated, and may be reused, for an extended period of time until new precalculation, e.g., when the network node 411 may be rebooted by the operator. The mapping according to the prior art method is however, performed every time one or more messages are to be transmitted.

Figure 14:
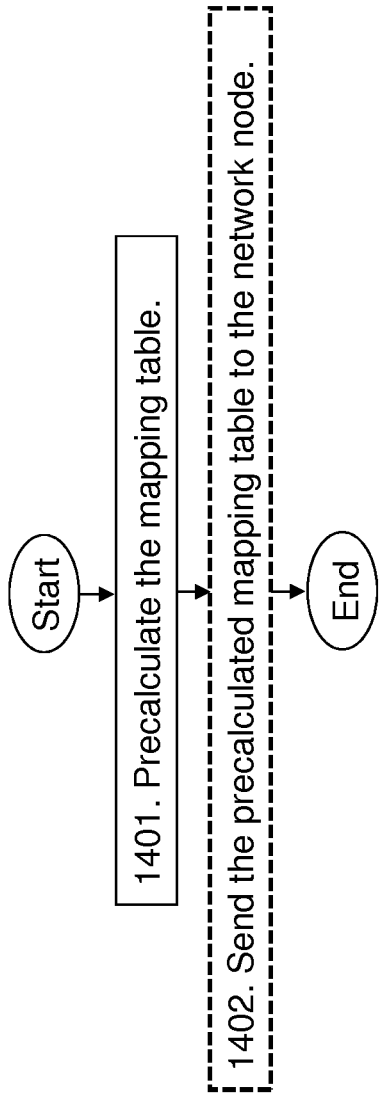
FIG. 14 is a flowchart depicting embodiments of a method in a second network node.

Embodiments of a method in the second network node 412 of precalculating a mapping table for a network node 411 to map one or more messages onto transmission resource for transmitting to a wireless device 430, will now be described with reference to the flowchart depicted in FIG. 14 and the schematic diagrams depicted in FIG. 8a-13a-b. FIG. 14 depicts a flowchart of the actions that are or may be performed by the second network node 412 in embodiments herein. Discontinued lines depict optional actions. A continuous line depicts a mandatory action. The one or more messages are processed by the network node 411. The second network node 412, the network node 411, and the wireless device 430 are adapted to be comprised in a wireless communications network 400.

In some embodiments, all the actions may be carried out, whereas in other embodiments only some action/s may be carried out.

In some of the following embodiments, the description of the one or more messages and the transmission resource is equivalent to that provided in relation to FIG. 5, and will therefore not be repeated here.

Action 1401

The second network node 412 precalculates the mapping table to map the one or more processed messages onto the transmission resource, wherein the precalculated mapping table is calculated prior to obtaining the one or more messages to be mapped, and wherein the precalculated mapping table comprises a map of indexed information in the transmission resource, the indexed information comprising one or more indexes, and one or more indexed information units, each with its corresponding index of the one or more indexes, and the transmission resource comprising one or more transmission units, wherein each of the one or more indexes of the indexed information is allocated a transmission resource unit, and wherein each of the one or more indexes in the indexed information corresponds to indexing information comprised in the one or more messages.

Any further description of the precalculating of the mapping table is equivalent to that provided in relation to FIGS. 5 and 8a-13, and will therefore not be repeated here.

Action 1402

The second network node 412 sends the precalculated mapping table to the network node 411. For example, this may be implement over a packed data network, e.g., S1 Application Protocol (S1AP).

Figure 15:
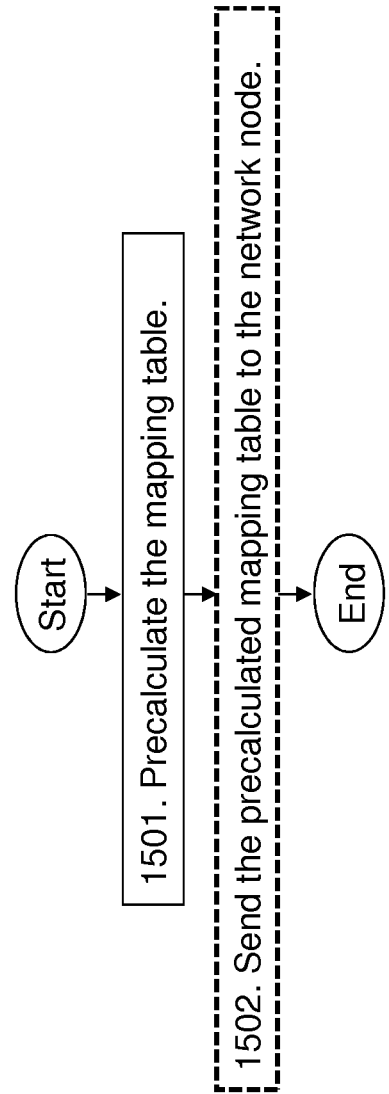
FIG. 15 is a flowchart depicting embodiments of a method in a core network node.

Embodiments of a method in the core network node 461 of precalculating a mapping table for a network node 411 to map one or more messages onto transmission resource for transmitting to a wireless device 430, will now be described with reference to the flowchart depicted in FIG. 15 and the schematic diagrams depicted in FIG. 8a-13. FIG. 15 depicts a flowchart of the actions that are or may be performed by the core network node 461 in embodiments herein. Discontinued lines depict optional actions. A continuous line depicts a mandatory action. The one or more messages are processed by the network node 411. The core network node 461, the network node 411, and the wireless device 430 are adapted to be comprised in a wireless communications network 400

In some embodiments, all the actions may be carried out, whereas in other embodiments only some action/s may be carried out.

In some of the following embodiments, the description of the one or more messages and the transmission resource is equivalent to that provided in relation to FIG. 5, and will therefore not be repeated here.

Action 1501

The core network node 461 precalculates the mapping table to map the one or more processed messages onto the transmission resource, wherein the precalculated mapping table is calculated prior to obtaining the one or more messages to be mapped, and wherein the precalculated mapping table comprises a map of indexed information in the transmission resource, the indexed information comprising one or more indexes, and one or more indexed information units, each with its corresponding index of the one or more indexes, and the transmission resource comprising one or more transmission units, wherein each of the one or more indexes of the indexed information is allocated a transmission resource unit, and wherein each of the one or more indexes in the indexed information corresponds to indexing information comprised in the one or more messages.

Any further description of the precalculating of the mapping table is equivalent to that provided in relation to FIGS. 5 and 8a-13, and will therefore not be repeated here.

Action 1502

The core network node 461 sends the precalculated mapping table to the network node 411. For example, this may be implement over a packed data network, e.g., S1AP.

Embodiments of a method in a wireless communications network 400 of mapping by a network node 411 one or more messages onto transmission resource for transmitting to a wireless device 430, will now be described with reference to the flowcharts depicted depicted in FIGS. 5, 14 and 15 and the schematic diagrams depicted in FIG. 8a-13. Each of FIGS. 5, 14 and 15 depicts a flowchart of the actions that are or may be performed by the wireless communications network 400 in embodiments herein. Discontinued lines depict optional actions. A continuous line depicts a mandatory action. The one or more messages are processed by the network node 411. The network node 411, and the wireless device 430 are adapted to be comprised in the wireless communications network 400.

In some embodiments, all the actions may be carried out, whereas in other embodiments only some action/s may be carried out.

In some of the following embodiments, the description of the one or more messages and the transmission resource is equivalent to that provided in relation to FIG. 5, and will therefore not be repeated here. Likewise, additional actions represented in FIGS. 5, 14 and 15, have already been described and will therefore not be repeated here.

Action 1401, 1501

One of the second network node 412 and the core network node 461 precalculates 1401, 1501 the mapping table to map the one or more processed messages onto the transmission resource. The second network node 412 and the core network node 461 are adapted to be comprised in the wireless communications network 400, Action 1402, 1502

One of the second network node 412 and the core network node 461, i.e., the one which has carried out the precalculation, sends 1402, 1502 the precalculated mapping table to the network node 411.

Action 507

The network node 411 maps, by, the one or more processed messages onto the transmission resource, according to indexing information comprised in the one or more messages, and to the precalculated mapping table. The precalculated mapping table is calculated prior to obtaining the one or more messages to be mapped. As already stated, this is implemented as described earlier.

Action 508

The network node 411 transmits 508 the transmission resource comprising the processed one or more messages to the wireless device 430.

Figure 16:
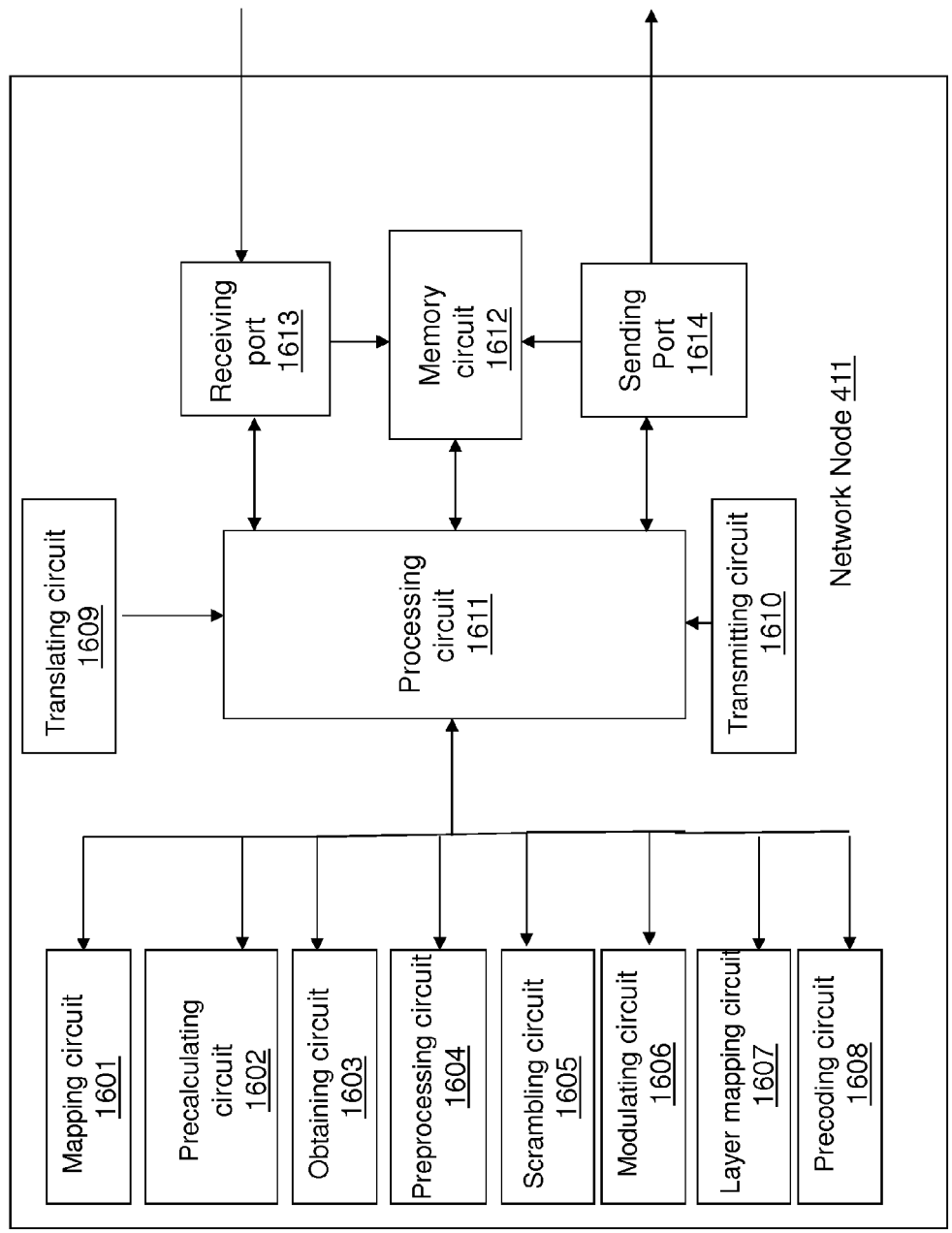
FIG. 16 is a schematic block diagram illustrating embodiments of the first network node.

To perform the method actions in the network node 411 described above in relation to FIGS. 5-13 for mapping one or more messages onto transmission resource, configured to be transmitted to the wireless device 430, the network node 411 comprises the following arrangement depicted in FIG. 16. The network node 411 is configured to process the one or more messages. The network node 411 and the wireless device 430 are adapted to be comprised in the wireless communications network 400.

The network node 411 comprises a mapping circuit 1601 configured to map the one or more processed messages onto the transmission resource, according to indexing information comprised in the one or more messages, and to a precalculated mapping table, wherein the precalculated mapping table is configured to be calculated prior to obtaining the one or more messages to be mapped.

The network node 411 may also comprise a precalculating circuit 1602 configured to precalculate the mapping table to map the one or more processed messages onto the transmission resource.

In some embodiments, the mapping circuit 1601 or the precalculating circuit 1602 is configured to map or to precalculate, respectively using a frequency-first algorithm.

In some embodiments, the precalculated mapping table comprises a map of indexed information in the transmission resource, the indexed information comprising one or more indexes, and one or more indexed information units, each with its corresponding index of the one or more indexes, and the transmission resource comprising one or more transmission units, wherein each of the one or more indexes of the indexed information is configured to be allocated a transmission resource unit, and wherein each of the one or more indexes in the indexed information correspond to indexing information comprised in the one or more messages.

In some embodiments, the network node 411 may comprise an obtaining circuit 1603 configured to obtain the one or more messages.

In some embodiments, each of the one or more messages comprises downlink information.

In some embodiments, each of the one or more messages is a Downlink Control Information, DCI, message.

In some embodiments, the transmission resource is one or more Resource Element, RE, groups.

In some embodiments, the network node 411 may comprise a preprocessing circuit 1604 configured to preprocess the one or more messages to encode the one or more messages into a channel. In some particular embodiments, the preprocessing comprises one or more of: CRC attachment, encoding, and rate matching.

In some embodiments, the channel is a Physical Downlink Control Channel.

In some embodiments, the network node 411 may comprise a scrambling circuit 1605 configured to perform bit scrambling on the preprocessed one or more messages.

In some embodiments, the network node 411 may comprise a modulating circuit 1606 configured to modulate the scrambled preprocessed one or more messages.

In some embodiments, the network node 411 may comprise a layer mapping circuit 1607 configured to perform layer mapping on the modulated scrambled preprocessed one or more messages.

In some embodiments, the network node 411 may comprise a precoding circuit 1608 configured to perform precoding on the layer mapped modulated scrambled preprocessed one or more messages.

In some embodiments, the network node 411 may comprise a translating circuit 1609 configured to translate groups of bits from the modulated and/or layer mapped and/or precoded, scrambled preprocessed one or more messages into modulation scheme units.

In some embodiments, the precalculated mapping table, is a mapping table of indexed modulation scheme units, wherein the indexed modulation scheme units are indexed quadruplets associated with a Quadrature Phase Shift Keying modulation scheme.

In some embodiments, the network node 411 may comprise a transmitting circuit 1610 configured to transmit the transmission resource comprising the processed one or more messages.

In some embodiments, the transmitting circuit 1610 is configured to transmit the transmission resource to the wireless device 430.

In some embodiments, one of: the mapping circuit 1601, the preprocessing circuit 1604, the scrambling circuit 1605, the modulating circuit 1606, the layer mapping circuit 1607, the precoding circuit 1608, and the translating circuit 1609, are further configured, respectively, to: map, preprocess, bit scramble, modulate, layer map, precode, and translate, the one or more messages in parallel.

In some further embodiments, the one or more processed messages comprise the one or more messages, that have been at least one of the following by the network node 411:
preprocessed to encode the one or more messages into a channel,
performed bit scrambling on the preprocessed one or more messages,
modulated the scrambled preprocessed one or more messages,
performed layer mapping on the modulated scrambled preprocessed one or more messages,
performed precoding on the layer mapped modulated scrambled preprocessed one or more messages, and
translated groups of bits from the modulated and/or layer mapped and/or precoded, scrambled preprocessed one or more messages into modulation scheme units.

The embodiments herein for mapping one or more messages onto transmission resource may be implemented through one or more processors, such as a processing circuit 1611 in the network node 411 depicted in FIG. 16, together with computer program code for performing the functions and actions of the embodiments herein. The program code mentioned above may also be provided as a computer program product, for instance in the form of a data carrier carrying computer program code for performing the embodiments herein when being loaded into the in the network node 411. One such carrier may be in the form of a CD ROM disc. It may be however feasible with other data carriers such as a memory stick. The computer program code may furthermore be provided as pure program code on a server and downloaded to the network node 411.

The network node 411 may further comprise a memory circuit 1612 comprising one or more memory units. The memory circuit 1612 may be arranged to be used to store data in relation to applications to perform the methods herein when being executed in the network node 411. Memory circuit 1612 may be in communication with the processing circuit 1611. Any of the other information processed by the processing circuit 1611 may also be stored in the memory circuit 1612.

In some embodiments, information such as the one or more messages may be received through a receiving port 1613. In some embodiments, the receiving port 1613 may be, for example, connected to the one or more antennas in the network node 411. In other embodiments, the network node 411 may receive information from another structure in the wireless communications network 400 through the receiving port 1613. Since the receiving port 1613 may be in communication with the processing circuit 1611, the receiving port 1613 may then send the received information to the processing circuit 1611. The receiving port 1613 may also be configured to receive other information.

The information processed by the processing circuit 1611 in relation to the embodiments of method herein may be stored in the memory circuit 1612 which, as stated earlier, may be in communication with the processing circuit 1611 and the receiving port 1613.

The processing circuit 1611 may be further configured to transmit information, such as the transmission resource comprising the processed one or more messages, to wireless device 430, through a sending port 1614, which may be in communication with the processing circuit 1611, and the memory circuit 1612.

Those skilled in the art will also appreciate that the different circuits 1601-1610 described above may refer to a combination of analog and digital circuits, and/or one or more processors configured with software and/or firmware (e.g., stored in memory) that, when executed by the one or more processors such as the processing circuit 1611, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 17:
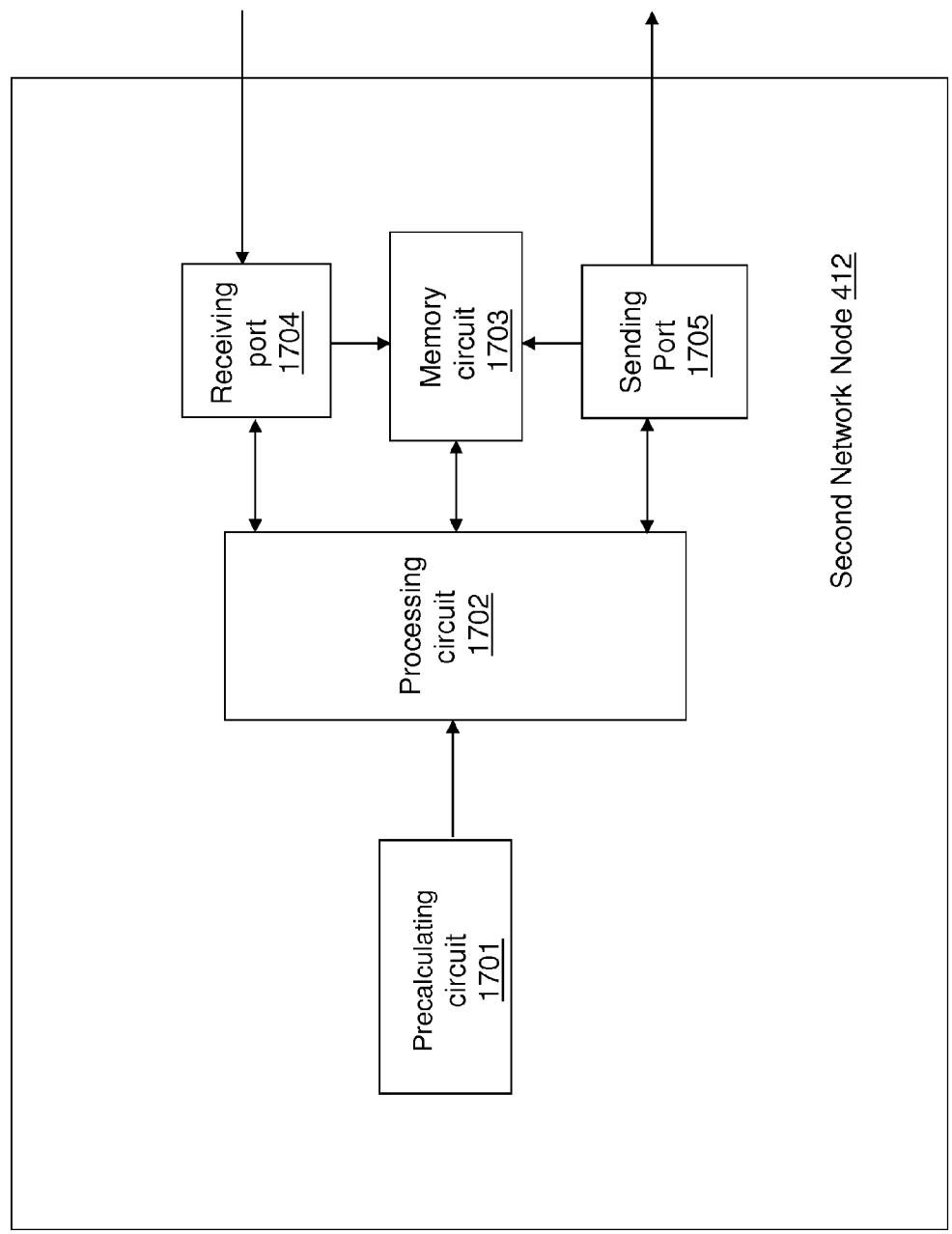
FIG. 17 is a schematic block diagram illustrating embodiments of the second network node.

To perform the method actions in the second network node 412 described above in relation to FIG. 14, the second network node 412 comprises the following arrangement depicted in FIG. 17. The second network node 412 is configured to precalculate a mapping table for a network node 411 to map one or more messages onto transmission resource for transmitting to a wireless device 430, wherein the one or more messages are configured to be processed by the network node 411, the second network node 412, the network node 411, and the wireless device 430 being adapted to be comprised in a wireless communications network 400.

The second network node 412 comprises a precalculating circuit 1701 configured to precalculate the mapping table to map the one or more processed messages onto the transmission resource, wherein the precalculated mapping table is configured to be calculated prior to obtaining the one or more messages to be mapped, and wherein the precalculated mapping table comprises a map of indexed information in the transmission resource, the indexed information comprising one or more indexes, and one or more indexed information units, each with its corresponding index of the one or more indexes, and the transmission resource comprising one or more transmission units, wherein each of the one or more indexes of the indexed information is allocated a transmission resource unit, and wherein each of the one or more indexes in the indexed information corresponds to indexing information comprised in the one or more messages.

The embodiments herein for mapping one or more messages onto transmission resource may be implemented through one or more processors, such as a processing circuit 1702 in the second network node 412 depicted in FIG. 17, together with computer program code for performing the functions and actions of the embodiments herein. The program code mentioned above may also be provided as a computer program product, for instance in the form of a data carrier carrying computer program code for performing the embodiments herein when being loaded into the second network node 412. One such carrier may be in the form of a CD ROM disc. It may be however feasible with other data carriers such as a memory stick. The computer program code may furthermore be provided as pure program code on a server and downloaded to the second network node 412.

The second network node 412 comprises the processing circuit 1702 that is configured to send the precalculated mapping table to the network node 411.

The second network node 412 may further comprise a memory circuit 1703 comprising one or more memory units. The memory circuit 1703 may be arranged to be used to store data such as, the information processed by the processing circuit 906 in relation to applications to perform the methods herein when being executed in the second network node 412. Memory circuit 1703 may be in communication with the processing circuit 1702. Any of the other information processed by the processing circuit 1702 may also be stored in the memory circuit 1703.

In some embodiments, the second network node 412 may further comprise a receiving port 1704, through which information may be received. In some embodiments, the receiving port 1704 may be, for example, connected to the one or more antennas in the second network node 412. In other embodiments, the second network node 412 may receive information from another structure in the wireless communications network 400 through the receiving port 1704. Since the receiving port 1704 may be in communication with the processing circuit 1702, the receiving port 1704 may then send the received information to the processing circuit 1702. The receiving port 1704 may also be configured to receive other information.

The information processed by the processing circuit 1702 in relation to, the precalculating, may be stored in the memory circuit 1703 which, as stated earlier, may be in communication with the processing circuit 1702 and the receiving port 1704.

The processing circuit 1702 may be further configured to transmit, send or signal information, such as the precalculated mapping table, to the network node 411, through a sending port 1705, which may be in communication with the processing circuit 1702, and the memory circuit 1703.

Those skilled in the art will also appreciate that the precalculating circuit 1701 described above may refer to a combination of analog and digital circuits, and/or one or more processors configured with software and/or firmware (e.g., stored in memory) that, when executed by the one or more processors such as the processing circuit 1702, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 18:
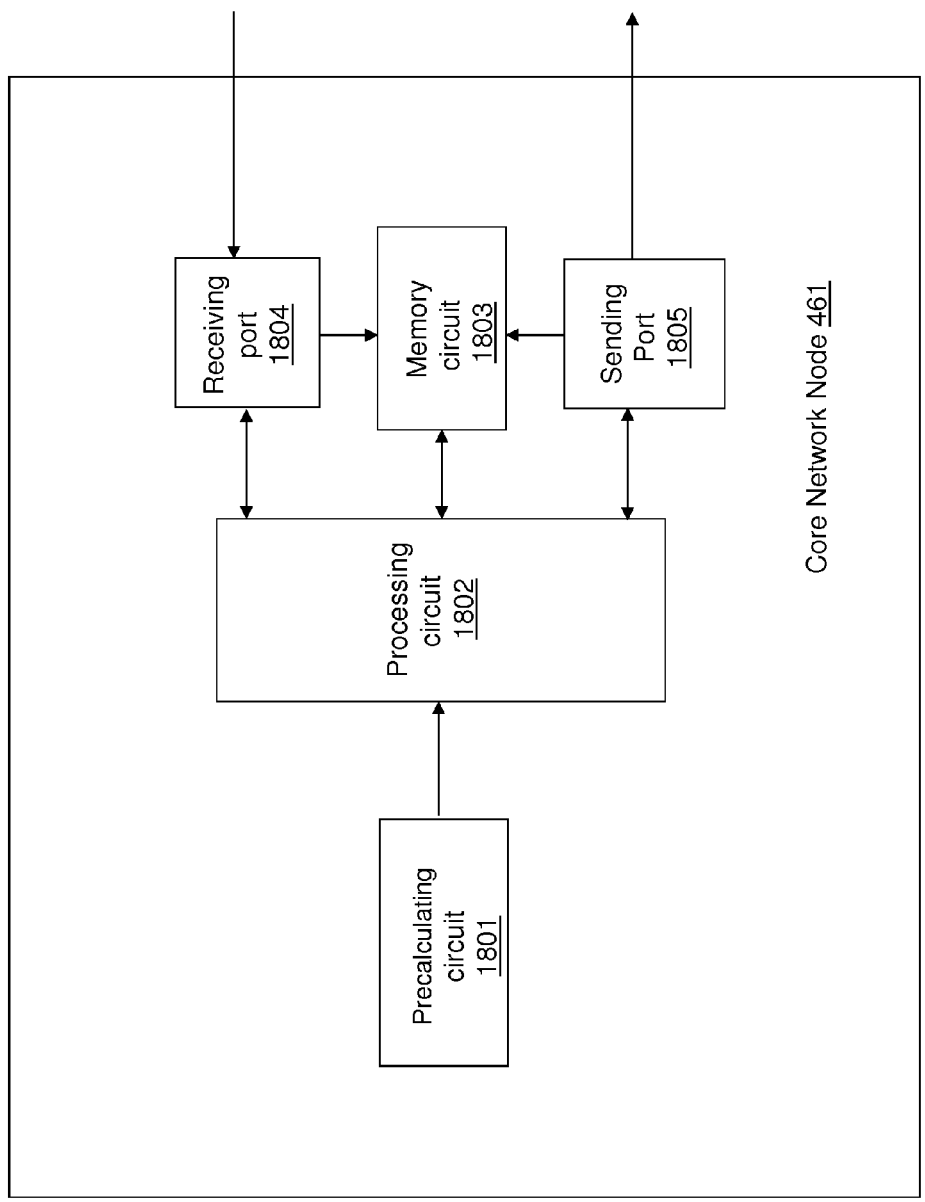
FIG. 18 is a schematic block diagram illustrating embodiments of the core network node.

To perform the method actions in the core network node 461 described above in relation to FIG. 15, the core network node 461 comprises the following arrangement depicted in FIG. 18. The core network node 461 is configured to precalculate a mapping table for a network node 411 to map one or more messages onto transmission resource for transmitting to a wireless device 430, wherein the one or more messages are configured to be processed by the network node 411, the core network node 461, the network node 411, and the wireless device 430 being adapted to be comprised in a wireless communications network 400.

The core network node 461 comprises a precalculating circuit 1801 configured to precalculate the mapping table to map the one or more processed messages onto the transmission resource, wherein the precalculated mapping table is configured to be calculated prior to obtaining the one or more messages to be mapped, and wherein the precalculated mapping table comprises a map of indexed information in the transmission resource, the indexed information comprising one or more indexes, and one or more indexed information units, each with its corresponding index of the one or more indexes, and the transmission resource comprising one or more transmission units, wherein each of the one or more indexes of the indexed information is allocated a transmission resource unit, and wherein each of the one or more indexes in the indexed information corresponds to indexing information comprised in the one or more messages.

The embodiments herein for mapping one or more messages onto transmission resource may be implemented through one or more processors, such as a processing circuit 1802 in the core network node 461 depicted in FIG. 18, together with computer program code for performing the functions and actions of the embodiments herein. The program code mentioned above may also be provided as a computer program product, for instance in the form of a data carrier carrying computer program code for performing the embodiments herein when being loaded into the core network node 461. One such carrier may be in the form of a CD ROM disc. It may be however feasible with other data carriers such as a memory stick. The computer program code may furthermore be provided as pure program code on a server and downloaded to the core network node 461.

The core network node 461 comprises the processing circuit 1802 that is configured to send the precalculated mapping table to the network node 411.

The core network node 461 may further comprise a memory circuit 1803 comprising one or more memory units. The memory circuit 1803 may be arranged to be used to store data such as, the information processed by the processing circuit 1802 in relation to applications to perform the methods herein when being executed in the core network node 461. Memory circuit 1803 may be in communication with the processing circuit 1802. Any of the other information processed by the processing circuit 1802 may also be stored in the memory circuit 1803.

In some embodiments, the core network node 461 may further comprise a receiving port 1804, through which information may be received. In some embodiments, the receiving port 1804 may be, for example, connected to the one or more antennas in the core network node 461. In other embodiments, the core network node 461 may receive information from another structure in the wireless communications network 400 through the receiving port 1804. Since the receiving port 1804 may be in communication with the processing circuit 1802, the receiving port 1804 may then send the received information to the processing circuit 1802. The receiving port 1804 may also be configured to receive other information.

The information processed by the processing circuit 1802 in relation to, the precalculating, may be stored in the memory circuit 1803 which, as stated earlier, may be in communication with the processing circuit 1802 and the receiving port 1804.

The processing circuit 1802 may be further configured to transmit, send or signal information, such as the precalculated mapping table, to the network node 411, through a sending port 1805, which may be in communication with the processing circuit 1802, and the memory circuit 1803.

Those skilled in the art will also appreciate that the precalculating circuit 1801 described above may refer to a combination of analog and digital circuits, and/or one or more processors configured with software and/or firmware (e.g., stored in memory) that, when executed by the one or more processors such as the processing circuit 1802, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 19:
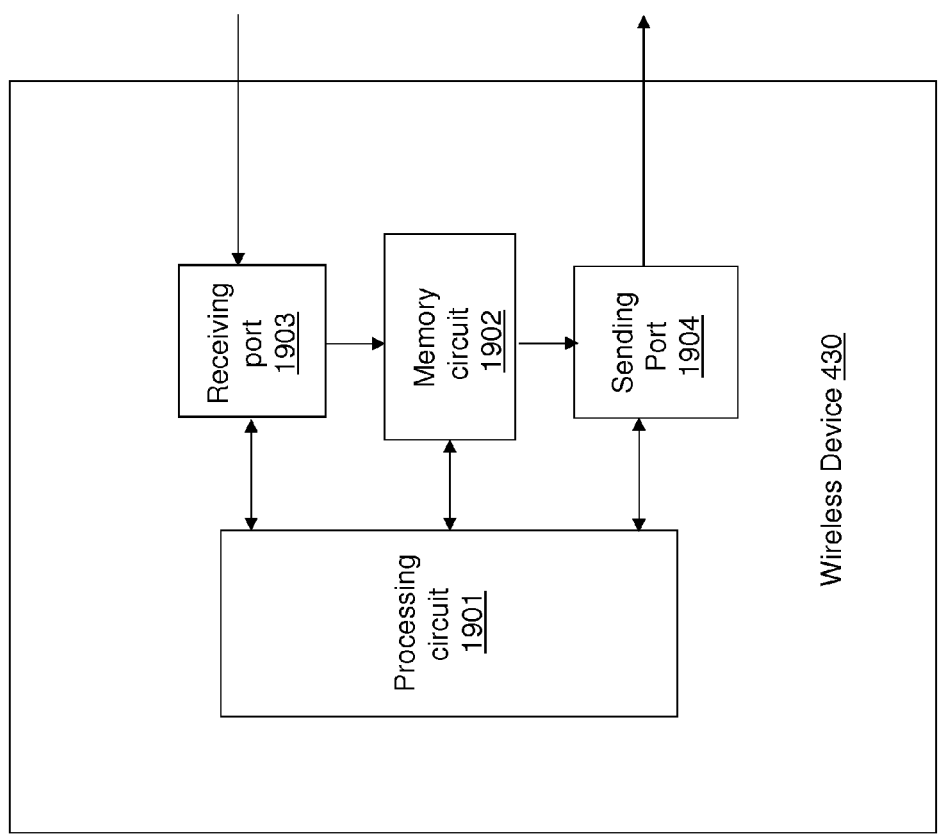
FIG. 19 is a schematic block diagram illustrating embodiments of a wireless device.

Wireless device 430 comprises the following arrangement depicted in FIG. 19. The wireless device 430 is adapted to be comprised in the wireless communications network 400.

The wireless device 430 may comprise one or more processors, such as a processing circuit 1901 in the wireless device 430 depicted in FIG. 19, together with computer program code for performing certain actions. The program code mentioned above may also be provided as a computer program product, for instance in the form of a data carrier carrying computer program code for performing the embodiments herein when being loaded into the in the wireless device 430. One such carrier may be in the form of a CD ROM disc. It may be however feasible with other data carriers such as a memory stick. The computer program code may furthermore be provided as pure program code on a server and downloaded to the wireless device 430.

The wireless device 430 may further comprise a memory circuit 1902 comprising one or more memory units. The memory circuit 1902 may be arranged to be used to store data in relation to applications to perform the methods herein when being executed in the wireless device 430. Memory circuit 1902 may be in communication with the processing circuit 1901. Any of the other information processed by the processing circuit 1901 may also be stored in the memory circuit 1902.

In some embodiments, information may be received through a receiving port 1903. In some embodiments, the receiving port 1903 may be, for example, connected to the one or more antennas in the wireless device 430. In other embodiments, the wireless device may receive information from another structure in the wireless communications network 400 through the receiving port 1903. Since the receiving port 1903 may be in communication with the processing circuit 1901, the receiving port 1903 may then send the received information to the processing circuit 1901. The receiving port 1903 may also be configured to receive other information.

Information may be stored in the memory circuit 1902 which, as stated earlier, may be in communication with the processing circuit 1901 and the receiving port 1903.

The wireless device 430 may also comprise a sending port 1904, which may be in communication with the processing circuit 1901, and the memory circuit 1902.

Those skilled in the art will also appreciate that the wireless device 430 may also comprise one or more circuits which may refer to a combination of analog and digital circuits, and/or one or more processors configured with software and/or firmware (e.g., stored in memory) that, when executed by the one or more processors such as the processing circuit 1901, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

To perform the method actions in the wireless communications network 400 described above in relation to FIGS. 5, 14 and 15, the wireless communications network 400 comprises the following arrangements depicted in FIGS. 4, and 16-19. The wireless communications network 400 is adapted to map, by the network node 411, the one or more messages onto transmission resource configured to be transmitted to the wireless device 430. The network node 411 is configured to process the one or more messages. The network node 411 and the wireless device 430 are adapted to be comprised in the wireless communications network 400.

In some of the following embodiments, the description of the one or more messages and the transmission resource is equivalent to that provided in relation to FIG. 5, and will therefore not be repeated here. Likewise, additional circuits represented in FIGS. 16-19, have already been described and will therefore not be repeated here.

The wireless communications network 400 comprises the precalculating circuit 1701, 1801 in one of a second network node 412 and a core network node 461, the precalculating circuit 1701, 1801 being configured to precalculate the mapping table to map the one or more processed messages onto the transmission resource. The second network node 412 and the core network node 461 are adapted to be comprised in the wireless communications network 400.

The wireless communications network 400 also comprises the processing circuit 1702, 1802, in one of the second network node 412 and the core network node 461, the processing circuit 1702, 1802 being configured to send the precalculated mapping table to the network node 411.

The wireless communications network 400 further comprises the mapping circuit 1601 comprised in the network node 411, mapping circuit 1601 being configured to map the one or more processed messages onto the transmission resource, according to indexing information comprised in the one or more messages, and to a precalculated mapping table. The precalculated mapping table is configured to be calculated prior to obtaining the one or more messages to be mapped.

The wireless communications network 400 yet further comprises the transmitting circuit 1610 comprised in the network node 411, the transmitting circuit 1610 being configured to transmit the transmission resource comprising the processed one or more messages.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Abbreviations
BS Base Station
BW Bandwidth
CID Cell Identity
CRS Cell-specific Reference Signal
DL Downlink
ESS Enhanced Synchronization Signal
ID Identity
LTE Long Term Evolution
MDT Minimization of drive test
OFDM Orthogonal Frequency Division Multiplexing
PBCH Physical Broadcast Channel
PCFICH Physical Control format Indicator
PDCCH Physical Downlink Control Channel
PDSCH Physical Downlink Shared Channel
PHICH Physical Hybrid ARQ Indicator Channel
PSS Primary Synchronization Signal
RAT Radio Access Technology
RE Resource Element
RB Resource Block
RRM Radio Resource Management
RSRQ Reference signal received quality
RSRP Reference signal received power
SFN Single Frequency Network
SSS Secondary Synchronization Signal
UE User Equipment
UL Uplink
SON Self Organizing Network
RSSI Received signal strength indicator
OTDOA Observed time difference of arrival

The invention claimed is:

1. A method, in a network node, of mapping one or more messages onto a transmission resource for transmitting to a wireless device, wherein the one or more messages are processed by the network node, wherein the network node and the wireless device are adapted to be comprised in a wireless communications network, the method comprising:
preprocessing the one or more messages to encode the one or more messages into a channel;
performing bit scrambling on the preprocessed one or more messages;
modulating the scrambled preprocessed one or more messages;
performing layer mapping on the modulated scrambled preprocessed one or more messages;
performing precoding on the layer-mapped modulated scrambled preprocessed one or more messages;
translating groups of bits, from the scrambled preprocessed one or more messages that are one or more of modulated, layer-mapped, and precoded, into modulation scheme units; and
mapping the scrambled preprocessed one or more messages that are one or more of modulated, layer-mapped, and precoded onto the transmission resource, according to indexing information comprised in the one or more messages, and according to a precalculated mapping table, wherein the precalculated mapping table is calculated prior to obtaining the one or more messages to be mapped and wherein the mapping comprises using the indexing information to access entries of the precalculated mapping table.

2. The method of claim 1, wherein the precalculated mapping table comprises a map of indexed information in the transmission resource, the indexed information comprising one or more indexes, and one or more indexed information units, wherein each of the one or more indexed information units has a corresponding index of the one or more indexes, and the transmission resource comprises one or more transmission units, wherein each of the one or more indexes of the indexed information is allocated a transmission resource unit, and wherein each of the one or more indexes in the indexed information corresponds to indexing information comprised in the one or more messages.

3. The method of claim 1, further comprising precalculating the mapping table to map the scrambled preprocessed one or more messages that are one or more of modulated, layer-mapped, and precoded onto the transmission resource.

4. The method of claim 1, wherein the mapping is performed using a frequency-first algorithm.

5. The method of claim 1, further comprising obtaining the one or more messages.

6. The method of claim 1, further comprising transmitting the transmission resource comprising the scrambled preprocessed one or more messages that are one or more of modulated, layer-mapped, and precoded.

7. The method of claim 6, wherein the the transmission resource is transmitted to the wireless device.

8. The method of claim 1, wherein each of the one or more messages comprises downlink information.

9. The method of claim 1, wherein each of the one or more messages is a Downlink Control Information (DCI) message.

10. The method of claim 1, wherein the transmission resource is one or more Resource Element (RE) groups.

11. The method of claim 1, wherein the channel is a Physical Downlink Control Channel.

12. The method of claim 1, wherein the precalculated mapping table is a mapping table of indexed modulation scheme units, and wherein the indexed modulation scheme units are indexed quadruplets associated with a Quadrature Phase Shift Keying modulation scheme.

13. The method of claim 1, wherein ones of the one or more messages are one of:
mapped,
preprocessed,
bit scrambled,
modulated,
layer-mapped,
precoded and
translated,
in parallel with other ones of the one or more messages.

14. A method in a network node of mapping one or more messages onto transmission resource for transmitting to a wireless device, wherein the one or more messages are processed by the network node, the network node and the wireless device being adapted to be comprised in a wireless communications network, the method comprising:
mapping the one or more processed messages onto the transmission resource, according to indexing information comprised in the one or more messages, and according to a precalculated mapping table, wherein the precalculated mapping table is calculated prior to obtaining the one or more messages to be mapped and wherein the mapping comprises using the indexing information to access entries of the precalculated mapping table,
wherein the one or more processed messages comprise the one or more messages, that have undergone at least one of the following actions by the network node:
preprocessing the one or more messages to encode the one or more messages into a channel,
performing bit scrambling on the preprocessed one or more messages,
modulating the scrambled preprocessed one or more messages,
performing layer mapping on the modulated scrambled preprocessed one or more messages,
performing precoding on the layer-mapped modulated scrambled preprocessed one or more messages, and
translating groups of bits from the preprocessed one or more messages that are at least one of modulated, layer-mapped, precoded, and scrambled into modulation scheme units, and
wherein ones of the one or more messages are one of:
mapped,
preprocessed,
bit scrambled,
modulated,
layer-mapped,
precoded and
translated,
in parallel with other ones of the one or more messages.

15. A network node adapted to map one or more messages onto transmission resource configured to be transmitted to a wireless device, the network node configured to process the one or more messages, and wherein the network node and the wireless device are adapted to be comprised in a wireless communications network, the network node comprising:
a preprocessing circuit configured to preprocess the one or more messages to encode the one or more messages into a channel;
a scrambling circuit configured to perform bit scrambling on the preprocessed one or more messages;
a modulating circuit configured to modulate the scrambled preprocessed one or more messages;
a layer-mapping circuit configured to perform layer mapping on the modulated scrambled preprocessed one or more messages;
a precoding circuit configured to perform precoding on the layer-mapped modulated scrambled preprocessed one or more messages;
a translating circuit configured to translate groups of bits from the scrambled preprocessed one or more messages that are one or more of modulated, layer-mapped and precoded into modulation scheme units; and
a mapping circuit configured to map the scrambled preprocessed one or more messages that are one or more of modulated, layer-mapped and precoded onto the transmission resource, according to indexing information comprised in the one or more messages, and according to a precalculated mapping table, wherein the precalculated mapping table is configured to be calculated prior to obtaining the one or more messages to be mapped and wherein the mapping circuit is configured to use the indexing information to access entries of the precalculated mapping table.

16. The network node of claim 15, wherein the precalculated mapping table comprises a map of indexed information in the transmission resource, the indexed information comprising one or more indexes, and one or more indexed information units, each with its corresponding index of the one or more indexes, and the transmission resource comprising one or more transmission units, wherein each of the one or more indexes of the indexed information is configured to be allocated a transmission resource unit, and wherein each of the one or more indexes in the indexed information correspond to indexing information comprised in the one or more messages.

17. The network node of claim 15, further comprising a precalculating circuit configured to precalculate the mapping table to map the scrambled preprocessed one or more messages that are one or more of modulated, layer-mapped and precoded onto the transmission resource.

18. The network node of claim 15, wherein the mapping circuit or the precalculating circuit is configured to map or to precalculate, respectively, using a frequency-first algorithm.

19. The network node of claim 15, further comprising an obtaining circuit configured to obtain the one or more messages.

20. The network node of claim 15, further comprising a transmitting circuit configured to transmit the transmission resource comprising the scrambled preprocessed one or more messages that are one or more of modulated, layer-mapped and precoded.

21. The network node of claim 15, wherein the transmitting circuit is configured to transmit the transmission resource to the wireless device.

22. The network node of claim 15, wherein each of the one or more messages comprises downlink information.

23. The network node of claim 15, wherein each of the one or more messages is a Downlink Control Information (DCI) message.

24. The network node of claim 15, wherein the transmission resource is one or more Resource Element (RE) groups.

25. The network node of claim 15, wherein the channel is a Physical Downlink Control Channel.

26. The network node of claim 15, wherein the precalculated mapping table is a mapping table of indexed modulation scheme units, and wherein the indexed modulation scheme units are indexed quadruplets associated with a Quadrature Phase Shift Keying modulation scheme.

27. The network node of claim 15, wherein at least one of: the mapping circuit, the preprocessing circuit, the scrambling circuit, the modulating circuit, the layer-mapping circuit, the precoding circuit, and the translating circuit, is further configured respectively, to:
map,
preprocess,
bit scramble,
modulate,
layer map,
precode and
translate,
the one or more messages in parallel.

28. A network node adapted to map one or more messages onto a transmission resource configured to be transmitted to a wireless device, the network node configured to process the one or more messages, and the network node and the wireless device being adapted to be comprised in a wireless communications network, the network node comprising:
a mapping circuit configured to map the one or more processed messages onto the transmission resource, according to indexing information comprised in the one or more messages, and according to a precalculated mapping table, wherein the precalculated mapping table is configured to be calculated prior to obtaining the one or more messages to be mapped and wherein the mapping circuit is configured to use the indexing information to access entries of the precalculated mapping table, a preprocessing circuit configured to preprocess the one or more messages to encode the one or more messages into a channel, a scrambling circuit configured to perform bit scrambling on the preprocessed one or more messages, a modulating circuit configured to modulate the scrambled preprocessed one or more messages, a layer-mapping circuit configured to perform layer mapping on the modulated scrambled preprocessed one or more messages, a precoding circuit configured to perform precoding on the layer-mapped modulated scrambled preprocessed one or more messages, and a translating circuit configured to translate groups of bits from the preprocessed one or more messages that are at least one of modulated, layer-mapped, precoded, and scrambled into modulation scheme units, wherein at least one of: the mapping circuit, the preprocessing circuit, the scrambling circuit, the modulating circuit, the layer mapping circuit, the precoding circuit, and the translating circuit, is further configured to respectively, to:

map,
preprocess,
bit scramble,
modulate,
layer map,
precode and
translate,
the one or more messages in parallel, and wherein the one or more processed messages comprise the one or more messages, that have been at least one of the following by the network node:

preprocessed to encode the one or more messages into a channel, performed bit scrambling on the preprocessed one or more messages, modulated the scrambled preprocessed one or more messages, performed layer mapping on the modulated scrambled preprocessed one or more messages, performed precoding on the layer-mapped modulated scrambled preprocessed one or more messages, and translated groups of bits, from the scrambled preprocessed one or more messages that are one or more of modulated, layer-mapped, and precoded, into modulation scheme units.

\* \* \* \* \*

UNITED STATES PATENT AND TRADEMARK OFFICE
CERTIFICATE OF CORRECTION

PATENT NO. : 9,712,311 B2
APPLICATION NO. : 14/110160
DATED : July 18, 2017
INVENTOR(S) : Ivanov et al.

It is certified that error appears in the above-identified patent and that said Letters Patent is hereby corrected as shown below:

In the Drawings

In Fig. 8a, Sheet 9 of 21, delete "(4,2) (36,0)," and insert -- (4,2), (36,0), --, therefor.

In Fig. 8c, Sheet 11 of 21, delete "j -= kk;" and insert -- j=kk; --, therefor.

In the Specification

In Column 2, Line 39, delete "messages," and insert -- messages; --, therefor.

In Column 6, Line 14, delete "in an illustrative" and insert -- is an illustrative --, therefor.

In Column 6, Line 17, delete "right, of" and insert -- right of --, therefor.

In Column 8, Line 29, delete "be for example," and insert -- be, for example, --, therefor.

In Column 8, Line 46, delete "core network node" and insert -- core network node 461 --, therefor.

In Column 12, Line 55, delete "Section" and insert -- Sections --, therefor.

In Column 13, Line 40, delete "network node" and insert -- network node 411 --, therefor.

In Column 14, Line 58, delete "FIG. 8a-12," and insert -- FIGS. 8a-12, --, therefor.

In Column 15, Line 8, delete "(4,2) (36,0)," and insert -- (4,2), (36,0), --, therefor.

In Column 15, Line 10, delete "A (A)" and insert -- A --, therefor.

In Column 15, Line 36, delete "FIG. 8a." and insert -- FIG. 8a; --, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)

U.S. Pat. No. 9,712,311 B2

In Column 16, Line 42, delete "j -= kk;" and insert -- j=kk; --, therefor.

In Column 17, Line 27, delete "may be also be" and insert -- may also be --, therefor.

In Column 17, Line 35, delete "FIG. 8a-12," and insert -- FIGS. 8a-12, --, therefor.

In Column 17, Line 40, delete "FIG. 8a-12," and insert -- FIGS. 8a-12, --, therefor.

In Column 18, Line 3, delete "FIG. 8a-12." and insert -- FIGS. 8a-12. --, therefor.

In Column 18, Line 28, delete "FIG. 8a-13a-b." and insert -- FIGS. 8a-13a-b. --, therefor.

In Column 18, Line 66, delete "may be implement" and insert -- may be implemented --, therefor.

In Column 19, Line 6, delete "FIG. 8a-13." and insert -- FIGS. 8a-13. --, therefor.

In Column 19, Lines 43-44, delete "may be implement" and insert -- may be implemented --, therefor.

In Column 19, Line 50, delete "FIG. 8a-13." and insert -- FIGS. 8a-13. --, therefor.

In Column 20, Line 1, delete "Action 1401, 1501" and insert -- Actions 1401, 1501 --, therefor.

In Column 20, Line 7, delete "400," and insert -- 400. --, therefor.

In Column 20, Line 8, delete "Action 1402, 1502" and insert -- Actions 1402, 1502 --, therefor.

In Column 25, Line 65, delete "wireless device" and insert -- wireless device 430 --, therefor.

In Column 27, Line 17, delete "Enhanced" and insert -- Extended --, therefor.

In Column 27, Line 23, delete "Indicator" and insert -- Indicator Channel --, therefor.

In the Claims

In Column 28, Line 30, in Claim 7, delete "wherein the the" and insert -- wherein the --, therefor.

In Column 28, Line 53, in Claim 13, delete "precoded and" and insert -- precoded, and --, therefor.

In Column 29, Line 27, in Claim 14, delete "precoded and" and insert -- precoded, and --, therefor.

In Column 30, Line 53, in Claim 27, delete "precode and" and insert -- precode, and --, therefor.

In Column 32, Line 6, in Claim 28, delete "precode and" and insert -- precode, and --, therefor.